US012775419B2

(12) United States Patent
Bhardwaj et al.

(10) Patent No.: US 12,775,419 B2
(45) Date of Patent: Oct. 27, 2026

(54) METHODS AND APPARATUS TO IMPROVE DATA MOVEMENT BETWEEN OPERATIONS

(71) Applicant: Texas Instruments Incorporated, Dallas, TX (US)

(72) Inventors: Asheesh Bhardwaj, Allen, TX (US); Barath Ramesh, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/638,394

(22) Filed: Apr. 17, 2024

(65) Prior Publication Data

US 2025/0328283 A1 Oct. 23, 2025

(51) Int. Cl.
*G06F 3/06* (2006.01)

(52) U.S. Cl.
CPC .......... *G06F 3/0659* (2013.01); *G06F 3/0613* (2013.01); *G06F 3/0656* (2013.01); *G06F 3/0673* (2013.01)

(58) Field of Classification Search
CPC .... G06F 3/0659; G06F 3/0613; G06F 3/0656; G06F 3/0673
See application file for complete search history.

(56) References Cited

U.S. PATENT DOCUMENTS 11,353,575 B1 * 6/2022 Robertson ............. G01S 13/872
2006/0190517 A1 * 8/2006 Guerrero ................. G06F 7/762 708/514
2007/0091678 A1 * 4/2007 Kato ...................... G11C 16/32 365/185.09
2009/0016450 A1 * 1/2009 Wang ..................... H04N 19/61 375/E7.193
2016/0033631 A1 * 2/2016 Searcy .................... G01S 13/18 342/132
2017/0262410 A1 * 9/2017 Usui ....................... H04L 67/10
2017/0286293 A1 * 10/2017 Gayman ............. G06F 12/0646
2020/0409664 A1 * 12/2020 Li ......................... G06F 9/3836
2022/0121506 A1 * 4/2022 Raut ....................... G06F 9/546
2022/0383935 A1 * 12/2022 You ..................... G11C 11/4087
(Continued)

OTHER PUBLICATIONS

Slides from "15-740 / 18-740 Computer Architecture Lecture 19: Main Memory" by Prof Onur Mutlu of Carnegie Mellon. (Year: 2010).*
(Continued)

*Primary Examiner* — Janice M. Girouard
(74) *Attorney, Agent, or Firm* — Michael T. Gabrik; Charles F. Koch

(57) ABSTRACT

An example apparatus includes: memory circuitry structured to store an array of data; streaming engine circuitry coupled to the memory circuitry; and programmable circuitry coupled to the memory circuitry and the streaming engine circuitry, the programmable circuitry configured to at least one of execute or instantiate machine-readable instructions to at least: cause the streaming engine circuitry to copy a portion of the array of data from a memory location in the memory circuitry to a buffer responsive to the programmable circuitry processing the portion of the array of data; and write a transpose of the portion of the array of data to the memory location in the memory circuitry.

22 Claims, 11 Drawing Sheets

(56) References Cited

U.S. PATENT DOCUMENTS

| | | | | |
|---|---|---|---|---|
| 2024/0111528 | A1* | 4/2024 | Tan | G06N 3/045 |
| 2026/0010492 | A1* | 1/2026 | Blixt | G06F 13/1663 |

OTHER PUBLICATIONS

A screen shot of the merriam webster definition of transpose (Year: 2023).*
An articled titeld Executing Commands in Memory: DRAM Commands, by Stephen St. Michael. (Year: 2019).*
Singh et al., "Methods and Apparatus to Reduce Power Consumption of Radar Memoryoperations," Unpublished U.S. Appl. No. 18/391,109, filed Dec. 20, 2023, 55 pages.

* cited by examiner

METHODS AND APPARATUS TO IMPROVE DATA MOVEMENT BETWEEN OPERATIONS

TECHNICAL FIELD

This description relates generally to data movement and, more particularly, to methods and apparatus to improve data movements between operations.

BACKGROUND

As electronics continue to advance, systems have become capable of performing increasingly complex operations. In signal processing systems, data for processing moves between different types of memory to facilitate performance of calculations using the data. When data is received by the processing system, the data is originally stored in first memory circuitry (referred to as external memory) before being transferred to second memory circuitry (referred to as internal memory), where the data is made accessible for processing.

SUMMARY

For methods and apparatus to improve data movement between operations, an example apparatus includes memory circuitry structured to store an array of data. The apparatus includes streaming engine circuitry coupled to the memory circuitry; and programmable circuitry coupled to the memory circuitry and the streaming engine circuitry, the programmable circuitry configured to at least one of execute or instantiate machine-readable instructions to at least: cause the streaming engine circuitry to copy a portion of the array of data from a memory location in the memory circuitry to a buffer responsive to the programmable circuitry processing the portion of the array of data; and write a transpose of the portion of the array of data to the memory location in the memory circuitry. Other examples are described. The term "copy" in the above context and similar contexts includes to write to data from a first location to a second location to produce a result of copying.

For methods and apparatus to improve data movement between operations, an example apparatus includes memory circuitry structured to store an array of data. The apparatus includes streaming engine circuitry coupled to the memory circuitry, the streaming engine circuitry structured to buffer data from the memory circuitry; and programmable circuitry coupled to the memory circuitry and the streaming engine circuitry, the programmable circuitry configured to at least one of execute or instantiate machine-readable instructions to at least: perform operations using the array of data; cause the streaming engine circuitry to buffer a portion of the array of data from a memory location in the memory circuitry responsive to the programmable circuitry performing the operations; and write a transpose of the portion of the array of data in the streaming engine circuitry to the memory location in the memory circuitry. Other examples are described.

For methods and apparatus to improve data movement between operations, an example at least one non-transitory computer readable storage medium. The one non-transitory computer readable storage medium includes instructions that perform calculations using an array of data in memory circuitry; cause streaming engine circuitry to buffer a portion of the array of data from a memory location in the memory circuitry after performing the calculations, and write a transpose of the portion of the array of data in the streaming engine circuitry to the memory location in the memory circuitry. Other examples are described.

Figure 1:
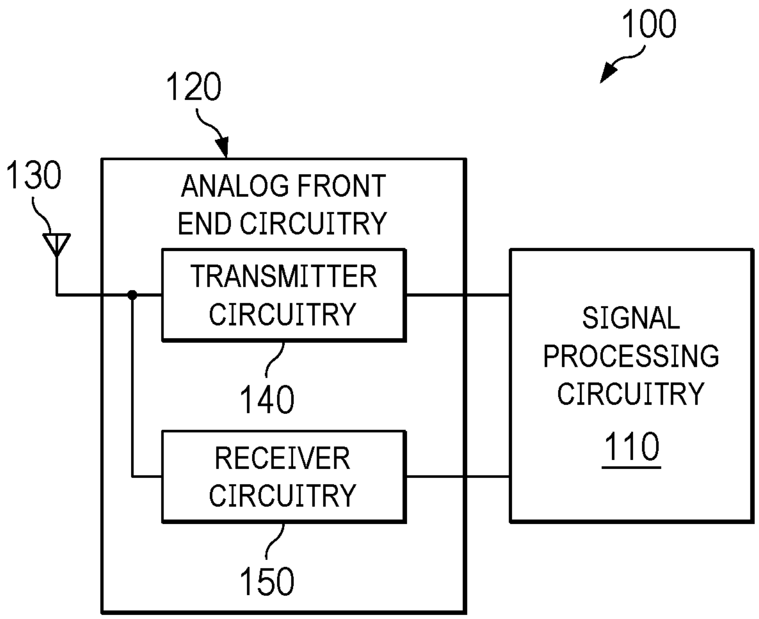
FIG. 1 is a block diagram of an example radar system in which example signal processing circuitry transmits and receives signals using example analog front-end circuitry.

The drawings are not necessarily to scale. Generally, the same reference numbers in the drawing(s) and this description refer to the same or similar (functionally and/or structurally) features and/or parts. Although the drawings show regions with clean lines and boundaries, some or all of these lines and boundaries may be idealized. In reality, the boundaries or lines may be unobservable, blended or irregular.

DETAILED DESCRIPTION

As electronics continue to advance, systems have become capable of performing increasingly complex operations. In signal processing systems, data for processing moves between different types of memory to facilitate performance of calculations using the data. When data is received by the processing system, the data is originally stored in first memory circuitry (referred to as external memory) before being transferred to second memory circuitry (referred to as internal memory), where the data is made accessible for processing.

The first memory circuitry is accessible to external data sources and has a relatively high capacity in comparison to the second memory circuitry. When in the first memory circuitry, data is traditionally made available for processing by transferring the data to the second memory circuitry. To facilitate the transfer of data between first and second memory circuitry, signal processing systems include circuitry to orchestrate the transfer.

In some signal processing systems, direct memory access (DMA) circuitry facilitates the transfer of data between the first and second memory circuitry. In some such signal processing systems, data router circuitry structures the DMA circuitry to facilitate a transfer of data from specific memory locations in the first memory circuitry to specific memory locations in the second memory circuitry. In operation, the data router circuitry structures the DMA circuitry to linearly transfer the data between the first and second memory circuitry. When linearly transferring data, the DMA circuitry writes data in a numerical order of memory addresses.

When in the second memory circuitry, streaming engine circuitry makes the data accessible for processing by programmable circuitry. The streaming engine circuitry buffers portions of the data in the second memory circuitry. When the programmable circuitry is ready to process the data that the streaming engine circuitry is buffering, the programmable circuitry executes machine-readable instructions to instantiate circuitry to perform calculations using the data from the streaming engine circuitry. Once the programmable circuitry finishes processing the data, the second memory no longer needs to store the data. In some operations, the data router circuitry transfers the data of the second memory circuitry to the first memory circuitry. In some systems, such as radar systems, the programmable circuitry performs a series of different calculations using data in the first memory. In such systems, the programmable circuitry may perform the different calculations at different times or have to reformate the data prior to performing subsequent calculations. In either case and between calculations, the data router circuitry transfers the data from the second memory circuitry to the first memory circuitry to make the portions of the second memory circuitry available for other operations.

To reformat data for subsequent calculations, the processing system allocates additional processing and memory resources to perform increasingly complex reformatting of data. In radar systems, increasingly large arrays of data need to be transposed between calculations. Some processing systems allocate an additional portion of either one of the first or second memory circuitry to write a transpose of the array of data. However, in memory constrained systems, allocating an additional portion of either one of the first or second memory circuitry may impact operations that occur between calculations. In other systems, the data router circuitry structures the DMA circuitry to transpose the data as it is being transferred between the first and second memory circuitry. However, the size of the array of data being transposed is constrained to predetermined sizes that often are substantially smaller than the increasingly large arrays of data.

Examples described herein include methods and apparatus to improve data movement between operations to reformat data without using additional memory. In some described examples, a processing system utilizes a movement of data through first memory circuitry, second memory circuitry, and buffer circuitry between processing operations to reformat an array of data. Prior to programmable circuitry performing first operations, data router circuitry causes a transfer of the array of data from the first memory circuitry to the second memory circuitry. Once the array of data is in the second memory circuitry, streaming engine circuitry, which includes the buffer circuitry, buffers portions of the array of data to provide the array of data to the programmable circuitry for the first operations. The programmable circuitry to cause streaming engine circuitry to buffer the portions of the array of data to make at least portions of the array of data available for processing.

After processing the portion of the array of data, the processing system causes the streaming engine circuitry to write a transpose of the portion of the array of data to an original memory location of the portion of the array in the second memory circuitry. The processing system continues to process and transpose all portions of the array of data. However, when the array of data is larger than the size of the buffer circuitry, an additional transpose of positionings of the portions of the array is needed to completely reformat the array of data. To perform the second transpose, the data router circuitry causes the transposed portions of the array to be transferred to the first memory circuitry. Once in the first memory circuitry and the processing system needs the transposed array of data to be made accessible for the second operations, the data router circuitry repositions the transposed portions of the array when transferring the transposed portions of the array to the second memory. In operation, the data router circuitry causes a performance of the second transpose operation responsive to repositioning the transposed portions of the array. Once in the second memory, the processing system has successfully reformatted the array of data for the second operations.

Advantageously, using the movement of data through the processing system to reformat the array of data does not need additional portions of either memory circuitry to be allocated for reformatting. Advantageously, using the buffer circuitry to perform a first transpose and the data router circuitry to perform a second transpose reduces a number of operations needed to be performed by the programmable circuitry to reformat the data. Advantageously, performing the first transpose using the buffer circuitry prevents constraints of using DMA circuitry from limiting a size of an array of data that may be transposed.

FIG. 1 is a block diagram of an example radar system 100. In the example of FIG. 1, the radar system 100 includes example signal processing circuitry 110, example analog front-end (AFE) circuitry 120, and an example antenna 130. The example AFE circuitry 120 of FIG. 1 includes example transmitter circuitry 140 and example receiver circuitry 150. In some examples, the radar system 100 may be integrated in a system such as a vehicle. In such examples, the radar system 100 determines characteristics of objects in an environment responsive to processing reflected signals.

The signal processing circuitry 110 has a first terminal and a second terminal. The first and second terminals of the signal processing circuitry 110 are coupled to the AFE circuitry 120. In the example of FIG. 1, the signal processing circuitry 110 is structured to receive digital data from the AFE circuitry 120. An example of the signal processing circuitry 110 is described and illustrated in connection with FIG. 2, below.

The AFE circuitry 120 has a first terminal, a second terminal, and a third terminal. The first and second terminals of the AFE circuitry 120 are coupled to the signal processing circuitry 110. The third terminal of the AFE circuitry 120 is coupled to the antenna 130. In the example of FIG. 1, the AFE circuitry 120 is structured to cause transmission of a signal using the antenna 130 responsive to signals from the signal processing circuitry 110.

The antenna 130 is coupled to the AFE circuitry 120. In some examples, the antenna 130 is electromagnetically coupled to another instance of the radar system 100. In such examples, the antenna 130 allows the radar system 100 to receive and transmit electro-magnetic waves that communicatively coupled communication systems.

The transmitter circuitry 140 has a first terminal and a second terminal. The first terminal of the transmitter circuitry 140 is coupled to the signal processing circuitry 110. The second terminal of the transmitter circuitry 140 is coupled to the antenna 130 and the receiver circuitry 150. In some examples, the transmitter circuitry 140 receives digital data from the signal processing circuitry 110. In such examples, the transmitter circuitry 140 supplies an electromagnetic signal, which represents the digital data, to the antenna 130 for transmission. Also, the transmitter circuitry

140 may include circuitry to support a plurality of communication channels. For example, the transmitter circuitry 140 may generate a plurality of signals across a plurality of channels to transmit multiple signals. Also, the transmitter circuitry 140 may be coupled to one or more means for transmitting signals.

The receiver circuitry 150 has a first terminal and a second terminal. The first terminal of the receiver circuitry 150 is coupled to the signal processing circuitry 110. The second terminal of the receiver circuitry 150 is coupled to the antenna 130 and the transmitter circuitry 140. In some examples, the receiver circuitry 150 is structured to generate digital values that represent an analog input signal from the antenna 130. In such examples, the receiver circuitry 150 includes one or more analog-to-digital converters (ADCs) that convert analog values from the antenna 130 to a digital output. The receiver circuitry 150 is structured to supply the digital output data to the signal processing circuitry 110. Also, the receiver circuitry 150 may include circuitry to support a plurality of communication channels. For example, the receiver circuitry 150 may receive a plurality of signals across a plurality of channels.

In example operations, the signal processing circuitry 110 causes the transmitter circuitry 140 to transmit an analog signal using the antenna 130. In the radar system 100, the transmitter circuitry 140 transmits a frequency modulated continuous wave (FMCW) (also referred to as "chirps"). In such example operations, the signal processing circuitry 110 determines characteristics of the chirps to perform different forms of radar detection. For example, the signal processing circuitry 110 may cause the transmitter circuitry 140 to transmit chirps at a specific frequency or with a specific amplitude. Also, the signal processing circuitry 110 adjusts the frequency of the chirps to detect objects at different speeds.

In example operations, the receiver circuitry 150 receives transmissions from the antenna 130. In the radar system 100, the receiver circuitry 150 receives a reflected FMCW signals (also referred to as "reflected chirps"). Reflected FMCW signals resulting from a reflection of the FMCW signals. The receiver circuitry 150 converts analog values of received signals to generate a digital output representing the received signal. In some examples, such as the radar system 100, the digital output of the receiver circuitry 150 represents the reflected chirp signal. The receiver circuitry 150 supplies the digital output of the reflected chirp signals to the signal processing circuitry 110 for processing.

In example operations, the signal processing circuitry 110 causes the transmitter circuitry 140 to transmit the chirp signals of known frequencies. The signal processing circuitry 110 receives the reflected chirps responsive to causing a transmission of chirp signals. The signal processing circuitry 110 mixes the frequencies of the chirp signals with the reflected chirps to generate beat signals (also referred to as "de-chirped signals). In some examples, the signal processing circuitry 110 filters the beat signals to remove frequencies outside of the bandwidth of the radar system 100 and generate frequency specific radar data.

Also, the signal processing circuitry 110 may include a digital front end (DFE) circuitry to perform further filtering on data of the radar data. For example, the DFE circuitry performs decimation operations, which at least one of reduces the sampling rate or brings the radar data to a baseband frequency range, remove DC offset, etc. Once the radar data has been filtered, the signal processing circuitry 110 stores the radar data in memory for processing. The signal processing circuitry 110 further includes a processing system to determine information using the radar data by performing calculations. An example of a processing system of the signal processing circuitry 110 is illustrated and described in connection with FIG. 2. In example operations, the signal processing circuitry 110 determines information such as object distances and speeds responsive to processing the radar data.

Figure 2:
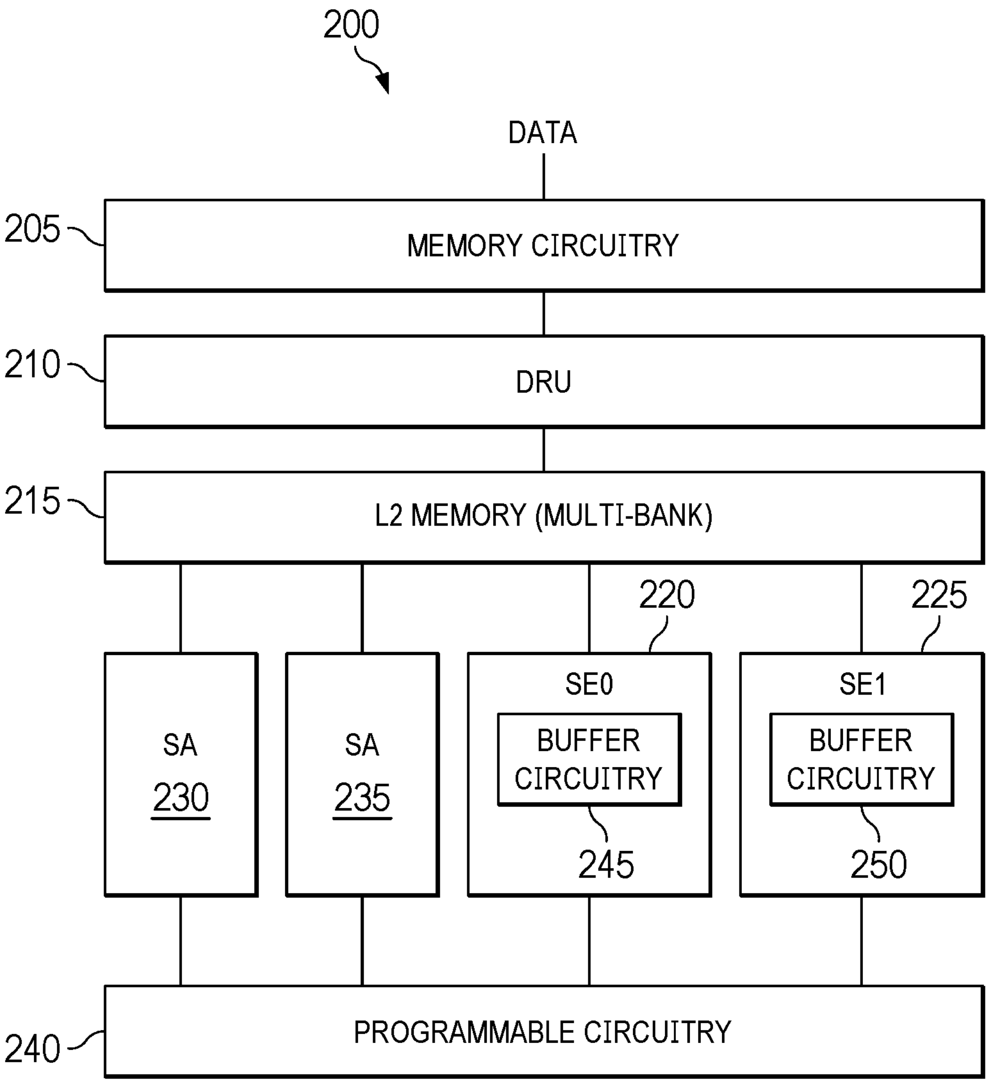
FIG. 2 is a block diagram of an example processing system of the signal processing circuitry of FIG. 1 including first memory circuitry, second memory circuitry, and buffer circuitry.

FIG. 2 is a block diagram of an example processing system 200, which is an example component of the signal processing circuitry 110 of FIG. 1. In the example of FIG. 2, the processing system 200 includes first memory circuitry 205, data router circuitry 210 (DRU), second memory circuitry 215, first example streaming engine circuitry 220, second example streaming engine circuitry 225, first streaming address generator circuitry 230, second streaming address generator circuitry 235, and programmable circuitry 240. The streaming engine circuitry 220 of FIG. 2 includes first example buffer circuitry 245. The streaming engine circuitry 225 of FIG. 2 includes second example buffer circuitry 250. In the example of FIG. 2, the processing system 200 is structured to receive data from an external data source by the memory circuitry 205. In some examples, the processing system 200 includes additional circuitry to orchestrate writing received data to the memory circuitry 205. In other examples, the external data source is structured to write data directly to the memory circuitry 205. In the example of the radar system 100 of FIG. 1, the signal processing circuitry 110 is structured to write radar data to the processing system 200.

The memory circuitry 205 is coupled to the data router circuitry 210. Also, the memory circuitry 205 may be coupled in circuit with an external data source, such as the AFE circuitry 120 of FIG. 1. In some examples, the memory circuitry 205 is a type of volatile memory, such as dynamic random-access memory (DRAM). Although in the example of FIG. 2, the memory circuitry 205 is illustrated internal to the processing system 200, in some examples, the memory circuitry 205 may be external to the processing system 200 or referred to as external memory circuitry. In such examples, the memory circuitry 205 may be in a package or on a chip that is separate from a package or chip containing one or more components of the processing system 200.

The data router circuitry 210 is coupled to the memory circuitry 205, 215. The data router circuitry 210 is structured to manage data between the memory circuitry 205, 215. For example, the data router circuitry 210 transfers data from the memory circuitry 205 to the memory circuitry 215. In such examples, the data router circuitry 210 may also write (or copy) data from the memory circuitry 215 to the memory circuitry 205. In some examples, the data router circuitry 210 structures direct memory access (DMA) circuitry to facilitate the transfer of data between the memory circuitry 205, 215. In such examples, the data router circuitry 210 may be referred to as DMA engine circuitry, which facilitates data transfer between memory circuitry 205, 215 using DMA. Also, the data router circuitry 210 may use 4D memory mapping to determine memory addresses to read from or write to.

The memory circuitry 215 is coupled to the data router circuitry 210, the streaming engine circuitry 220, 225, and the streaming address generator circuitry 230, 235. The memory circuitry 215 is a type of volatile memory, such as static random-access memory (SRAM). Although in the example of FIG. 2, the memory circuitry 215 is illustrated as a single component, in some examples, the memory circuitry 215 may be separated or portioned into multiple chunks of storage, referred to as banks. In such examples, different banks of the memory circuitry 215 may be in a package or on a chip that is separate from a package or chip of one or more components of the processing system 200. The memory circuitry 205 is referred to as cache memory or L2 memory. The memory circuitry 215 is structured to store data that is accessible to the programmable circuitry 240. In some examples, the programmable circuitry 240 is capable of reading data from or writing data to the memory circuitry 215 at speeds greater than a speed at which the programmable circuitry 240 may write to the memory circuitry 205. Advantageously, the memory circuitry 215 provides the programmable circuitry 240 with a highly accessible memory location to perform calculations.

FIG. 2 is a block diagram of an example implementation of the processing system 200 to process data. One or more portions of the processing system of FIG. 2 may be instantiated (e.g., creating an instance of, bring into being for any length of time, materialize, implement, etc.) by programmable circuitry such as a Central Processor Unit (CPU) executing first instructions. Also or alternatively, one or more portions of the processing system of FIG. 2 may be instantiated (e.g., creating an instance of, bring into being for any length of time, materialize, implement, etc.) by (i) an Application Specific Integrated Circuit (ASIC) or (ii) a Field Programmable Gate Array (FPGA) structured or configured in response to execution of second instructions to perform operations corresponding to the first instructions. Some or all of the circuitry of FIG. 2 may, thus, be instantiated at the same or different times. Some or all of the circuitry of FIG. 2 may be instantiated, for example, in one or more threads executing concurrently on hardware or in series on hardware. Moreover, in some examples, some or all of the circuitry of FIG. 2 may be implemented by microprocessor circuitry executing instructions or FPGA circuitry performing operations to implement one or more virtual machines or containers.

The streaming engine circuitry 220 is coupled to the memory circuitry 215 and the programmable circuitry 240. The streaming engine circuitry 220 is structured to facilitate a transfer of data from the memory circuitry 215 to the programmable circuitry 240. In some examples, streaming engine circuitry 220 reduces the complexity of reading memory from the memory circuitry 215. In the example of FIG. 2, the streaming engine circuitry 220 is structured to buffer data that is being read from or written to the memory circuitry 215.

The streaming engine circuitry 225 is coupled to the memory circuitry 215 and the programmable circuitry 240. The streaming engine circuitry 225 is structured similar to the streaming engine circuitry 220. Advantageously, the streaming engine circuitry 220, 225 provide multiple data paths between the memory circuitry 215 and the programmable circuitry 240. Advantageously, the streaming engine circuitry 220, 225 are structured to buffer data between the memory circuitry 215 and the programmable circuitry 240. Although in the example of FIG. 2, the processing system 200 includes the streaming engine circuitry 220, 225, the processing system 200 may be modified to include any number of data paths between the memory circuitry 215 and the programmable circuitry 240.

The streaming address generator circuitry 230, 235 are coupled to the memory circuitry 215 and the programmable circuitry 240. The streaming address generator circuitry 230, 235 are structured to facilitate storing and reading access patterns of reads from and writes to the memory circuitry 215. In some examples, the streaming address generator circuitry 230, 235 decreases the complexity in locating specific data in the memory circuitry 215. For example, the programmable circuitry 240 may use the streaming address generator circuitry 230, 235 to read from or write to specific memory addresses in the memory circuitry 215 without knowing exact memory addresses. In such examples, the streaming address generator circuitry 230, 235 map different memory addresses of the memory circuitry 215 to references (e.g., pointers) of the programmable circuitry 240.

The programmable circuitry 240 is coupled to the streaming engine circuitry 220, 225 and the streaming address generator circuitry 230, 235. The programmable circuitry 240 executes machine-readable instructions to instantiate circuitry (e.g., creating an instance of, bring into being for any length of time, materialize, implement, etc.) to perform operations. In some examples, the programmable circuitry 240 is digital signal processing (DSP) circuitry structured for a specific type of processing, such as vector processing. In the example of FIG. 2, the programmable circuitry 240 instantiates circuitry to perform calculations on data from the streaming engine circuitry 220, 225.

The buffer circuitry 245, 250 is coupled between the memory circuitry 215 and the programmable circuitry 240. The buffer circuitry 245, 250 are relatively small portions of memory circuitry structured to store data for brief periods of time. The data of the buffer circuitry 245, 250 is accessible by both the memory circuitry 215 and the programmable circuitry 240. In some examples, the programmable circuitry 240 is structured to read or write data using memory chunks that are approximately equal to the size of the buffer circuitry 245, 250. Also, the programmable circuitry 240 may cause the streaming engine circuitry 220, 225 to transfer contents of the buffer circuitry 245, 250 to the memory circuitry 215. In such examples, the streaming engine circuitry 220, 225 may transpose the data of the buffer circuitry 245, 250 during the transfer to the memory circuitry 215. Advantageously, the buffer circuitry 245, 250 allow the programmable circuitry 240 to preemptively call for memory from the memory circuitry 215 and store memory to be written to the memory circuitry 215. Advantageously, the buffer circuitry 245, 250 allows the programmable circuitry 240 to transpose portions of data without performing additional processing operations.

FIGS. 3A-3E are a timing diagram 300 of the memory circuitry 205, 215 of FIG. 2 and the buffer circuitry 245 of FIG. 2 during example operations to receive an example array of data 305, perform first operations using the array of data 305, reformat the array of data 305, and second operations using the reformatted data. In the example of FIG. 3, the timing diagram 300 illustrates the array of data 305, a first portion of data 310, a second portion of data 315, a third portion of data 320, a fourth portion of data 325, a first portion of transposed data 330, a second portion of transposed data 335, a third portion of transposed data 340, a fourth portion of transposed data 345, and a formatted array of data 350.

In the example operations of FIGS. 3A-3E, the processing system 200 of FIG. 2 performs the first operations using the array of data 305, which is in a first format. The processing system 200 uses the movement of the array of data 305 through the memory circuitry 205, 215 and the buffer circuitry 245 to generate the formatted array of data 350, which is the data of the array of data 305 in a second format. The processing system 200 performs the second operations using the formatted array of data 350. Advantageously, using memory circuitry 205, 215 and the buffer circuitry 245 to format the array of data 305 reduces the amount of additional memory needed to produce the formatted array of data

350 from the array of data. Advantageously, using memory circuitry 205, 215 and the buffer circuitry 245 to format the array of data 305 reduces the number of operations the programmable circuitry 240 of FIG. 2 needs to perform to generate the formatted array of data 350.

Figure 3A:
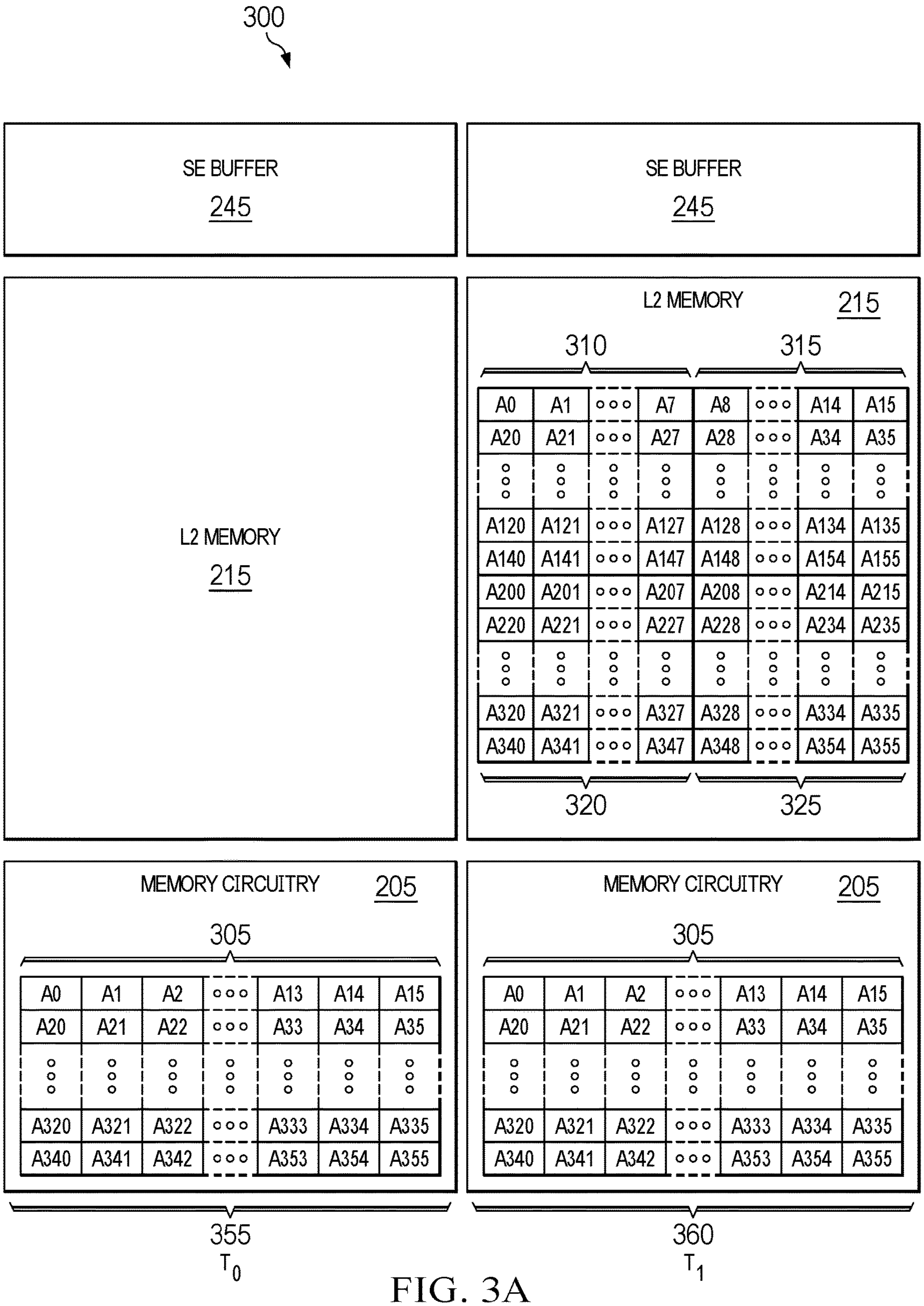
FIGS. 3A-3E are a timing diagram of the first memory circuitry of FIG. 2, the second memory circuitry of FIG. 2, and the buffer circuitry of FIG. 2 during example operations to format data for subsequent processing operations during example movements through the memory circuitry and the buffer circuitry.
Figure 3B:
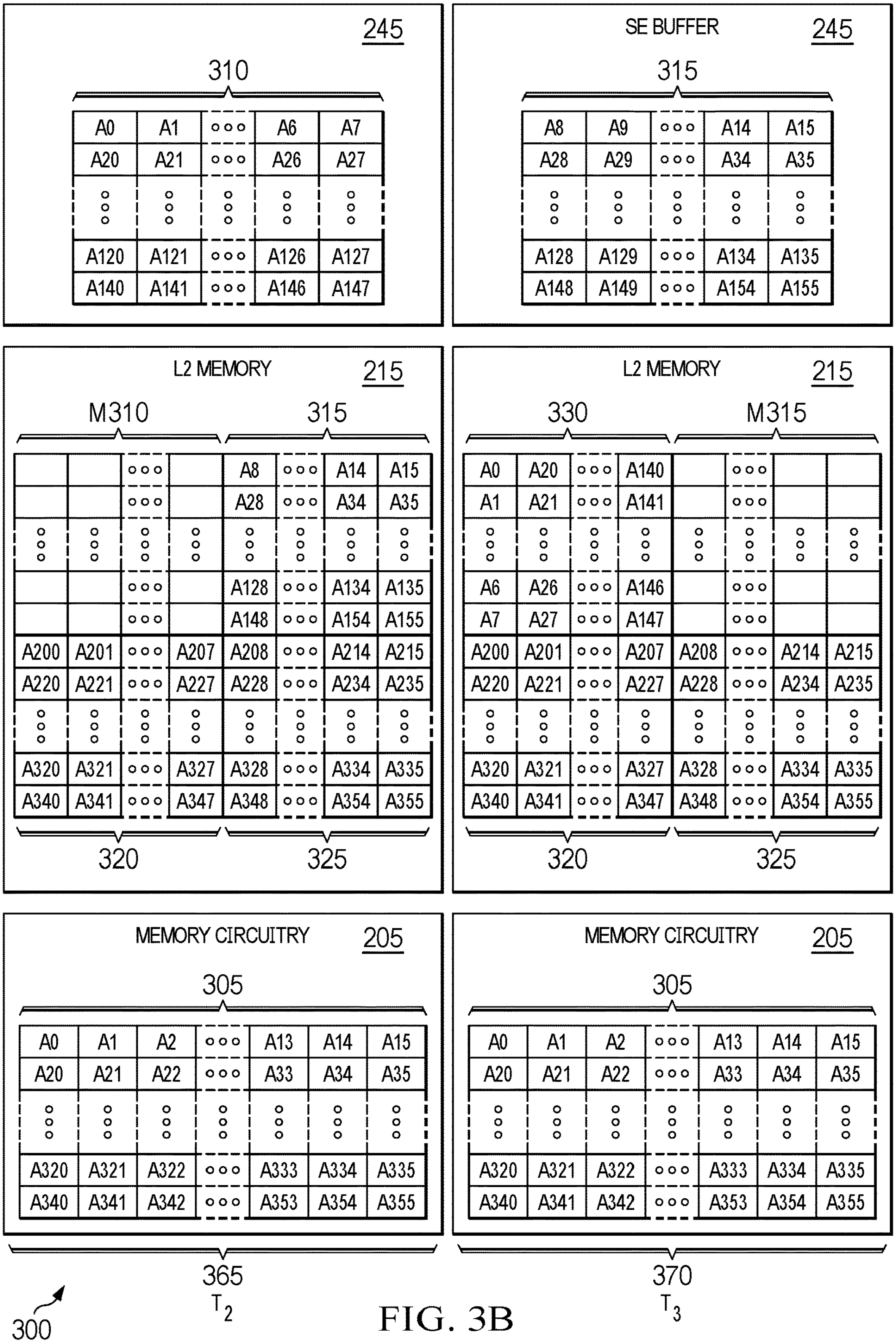
Figure 3C:
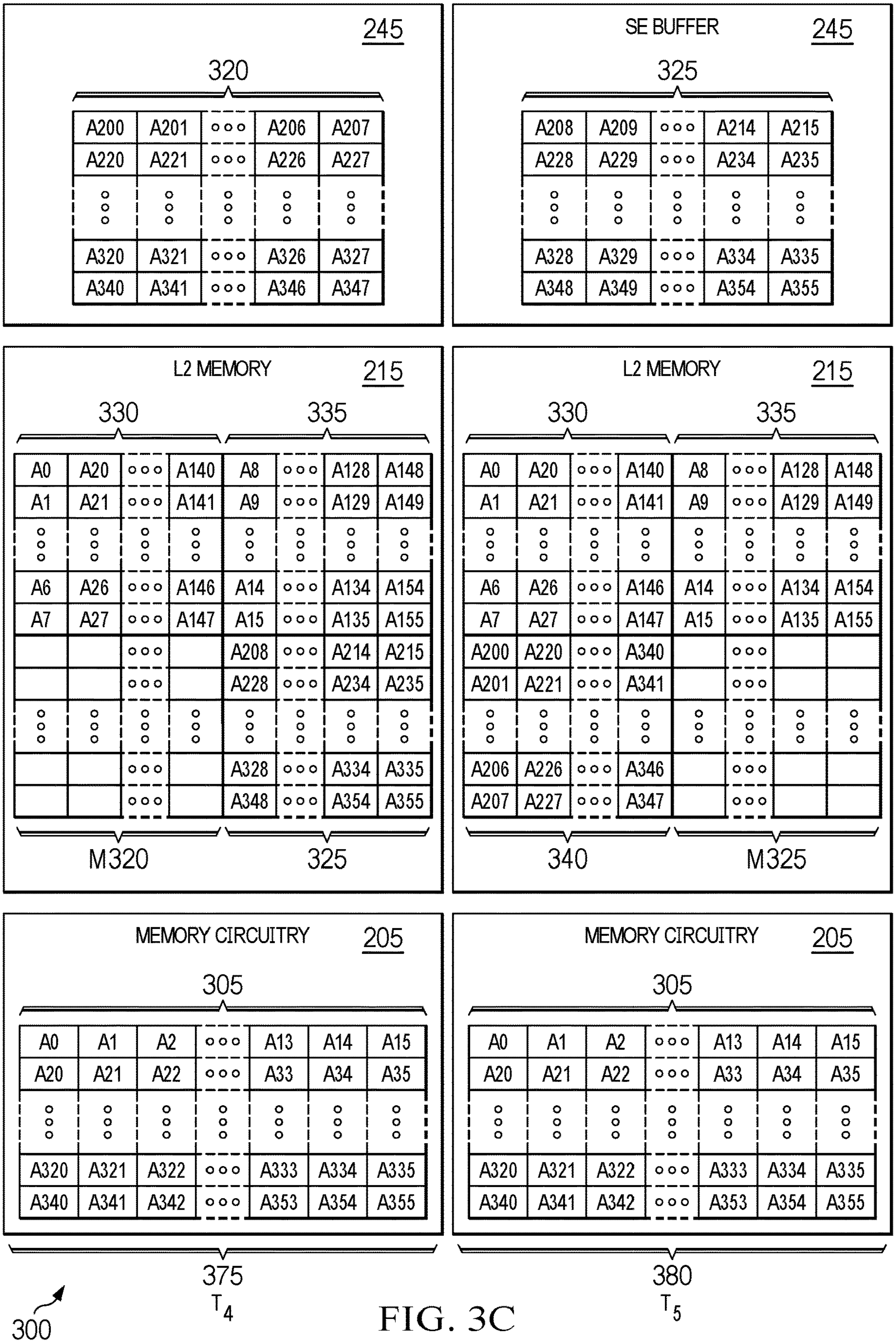
Figure 3D:
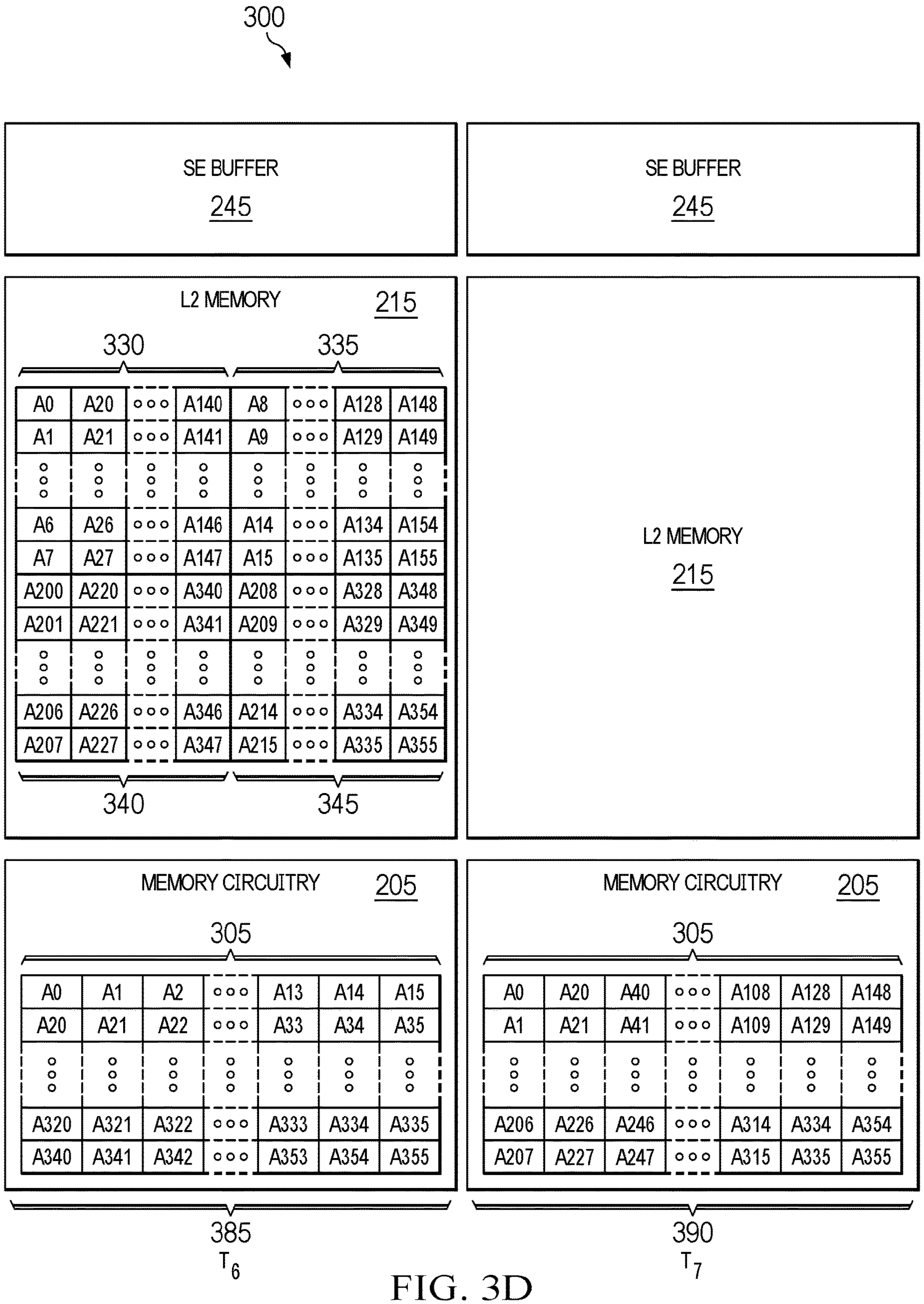

The timing diagram 300 begins at a first time 355 at which the memory circuitry 205 stores the array of data 305. Prior to the first time 355, an external data source writes the first array of data 305 to the memory circuitry 215. In the example of FIG. 3A, at the first time 355, the array of data 305 is formatted in rows. For example, a first row contains data A0 through A15, a second row contains data A20 through A35, a third row contains data A40 through A55, etc. In some examples, such as the radar system 100 of FIG. 1, data in the first format may be referred to as 3D data, where the axes are range, chirp, and receive value (RX). In such examples, the signal processing circuitry 110 is structured to write the radar data to the memory circuitry 205 to populate the array of data 305 with data of the first format.

Between the first time 355 and a second time 360, the data router circuitry 210 writes the array of data 305 to the memory circuitry 215. Once in the memory circuitry 215, the programmable circuitry 240 may use the streaming engine circuitry 220, 225 and the streaming address generator circuitry 235 to access the array of data 305 in the memory circuitry 215. Advantageously, the programmable circuitry 240 may read from and write to the memory circuitry 215 at data speeds greater than reading from and writing to the memory circuitry 205. After the second time 360, the programmable circuitry 240 may perform first operations using the array of data 305 in the memory circuitry 215. For example, in the radar system 100, the programmable circuitry 240 may perform a range fast Fourier transform (FFT) using the data of the array of data 305. A range FFT is a series of calculations that, when performed on data, convert the data to a frequency domain. For example, range FFT processing may be performed on the array of data 305 to generate peak values that correspond to ranges (e.g., distances) of objects.

Between the second time 360 and a third time 365, the streaming engine circuitry 220 buffers the first portion of data 310 using the buffer circuitry 245. In some examples, the streaming address generator circuitry 230, 235 stores memory addresses M310 of the first portion of data 310 in the memory circuitry 215. In such examples, the streaming address generator circuitry 230, 235 stores the memory addresses M310 responsive to the streaming engine circuitry 220 buffering data from the memory addresses M310.

Advantageously, after the third time 365 the programmable circuitry 240 may use the first portion of data 310 in the buffer circuitry 245 to perform calculations. Advantageously, after the third time 365, the programmable circuitry 240 may cause the streaming engine circuitry 220 to linearly write a transpose of the first portion of data 310 to the memory addresses M310 in the memory circuitry 215. Such a transpose of the first portion of the data 310 is referred to as the first portion of transposed data 330. Advantageously, the processing system 200 generates the first portion of transposed data 330 by writing a transpose of the first portion of data 310 from the buffer circuitry 245 to the memory addresses M310 in the memory circuitry 215.

Between the third time 365 and a fourth time 370, the streaming engine circuitry 220 writes the first portion of transposed data 330 to the memory addresses M310 in the memory circuitry 215. Also, between the third time 365 and the fourth time 370 and after writing the first portion of transposed data 330, the streaming engine circuitry 220 buffers the second portion of data 315 using the buffer circuitry 245. In some examples, the streaming address generator circuitry 230, 235 stores memory addresses M315 of the second portion of data 315 in the memory circuitry 215.

Advantageously, after the fourth time 370 the programmable circuitry 240 may use the second portion of data 315 in the buffer circuitry 245 to perform calculations. Advantageously, after the fourth time 370, the programmable circuitry 240 may cause the streaming engine circuitry 220 to linearly write a transpose of the second portion of data 315 to the memory addresses M315 in the memory circuitry 215. Such a transpose of the second portion of the data 315 is referred to as the second portion of transposed data 335. Advantageously, the processing system 200 generates the second portion of transposed data 335 by writing a transpose of the second portion of data 315 from the buffer circuitry 245 to the memory addresses M315 in the memory circuitry 215.

Between the fourth time 370 and a fifth time 375, the streaming engine circuitry 220 writes the second portion of transposed data 335 to the memory addresses M315 in the memory circuitry 215. Also, between the fourth time 370 and the fifth time 375 and after writing the second portion of transposed data 335, the streaming engine circuitry 220 buffers the third portion of data 320 using the buffer circuitry 245. In some examples, the streaming address generator circuitry 230, 235 stores memory addresses M320 of the third portion of data 320 in the memory circuitry 215.

Advantageously, after the fifth time 375 the programmable circuitry 240 may use the third portion of data 320 in the buffer circuitry 245 to perform calculations. Advantageously, after the fifth time 375, the programmable circuitry 240 may cause the streaming engine circuitry 220 to linearly write a transpose of the third portion of data 320 to the memory addresses M320 in the memory circuitry 215. Such a transposing of the third portion of the data 320 is referred to as the third portion of transposed data 340. Advantageously, the processing system 200 generates the third portion of transposed data 340 by writing a transpose of the third portion of data 320 from the buffer circuitry 245 to the memory addresses M320 in the memory circuitry 215.

Between the fifth time 375 and a sixth time 380, the streaming engine circuitry 220 writes the third portion of transposed data 340 to the memory addresses M320 in the memory circuitry 215. Also, between the fifth time 375 and the sixth time 380 and after writing the third portion of transposed data 340, the streaming engine circuitry 220 buffers the fourth portion of data 325 using the buffer circuitry 245. In some examples, the streaming address generator circuitry 230, 235 stores memory addresses M325 of the fourth portion of data 325 in the memory circuitry 215.

Advantageously, after the sixth time 380 the programmable circuitry 240 may use the fourth portion of data 325 in the buffer circuitry 245 to perform calculations. Advantageously, after the sixth time 380, the programmable circuitry 240 may cause the streaming engine circuitry 220 to linearly write a transpose of the fourth portion of data 325 to the memory addresses M325 in the memory circuitry 215. Such a transpose of the fourth portion of the data 325 is referred to as the fourth portion of transposed data 345. Advantageously, the processing system 200 generates the fourth portion of transposed data 345 by writing a transpose of the fourth portion of data 325 from the buffer circuitry 245 to the memory addresses M325 in the memory circuitry 215.

Between the sixth time 380 and a seventh time 385, the streaming engine circuitry 220 writes the fourth portion of transposed data 345 to the memory addresses M325 in the memory circuitry 215. At the seventh time 385, all of the portions of data 310, 315, 320, 325 have been replaced in the memory circuitry 215 with the portions of transposed data 330, 335, 340, 345. Advantageously, the processing system 200 replaced the portions of data 310, 315, 320, 325 with the portions of transposed data 330, 335, 340, 345 without using additional space in the memory circuitry 205, 215 or having the programmable circuitry 240 perform additional transpose operations.

Between the seventh time 385 and an eighth time 390, the data router circuitry 210 replaces the array of data 305 in the memory circuitry 205 with the portions of transposed data 330, 335, 340, 345. At the eighth time 390, the memory circuitry 205 includes the portions of transposed data 330, 335, 340, 345. At the eighth time 390, the memory circuitry 205 makes the portions of the memory circuitry 215, which stored the array of data 305, accessible for other operations.

Figure 3E:
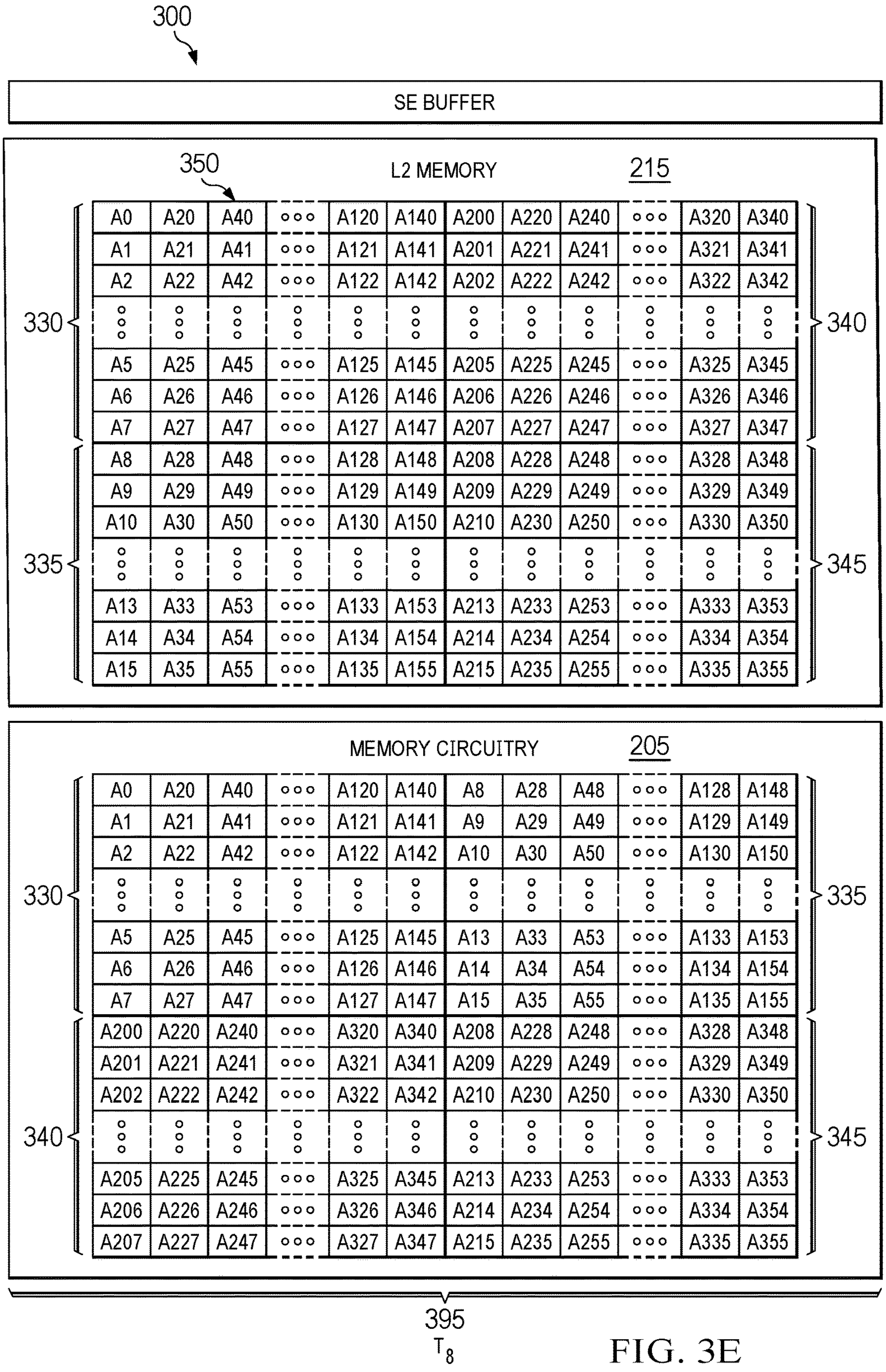

Between the eighth time 390 and a ninth time 395, the data router circuitry 210 transposes positioning of the portions of transposed data 330, 335, 340, 345 to form the formatted array of data 350 in the memory circuitry 215. For example, the data router circuitry 210 transposes the portions of transposed data 330, 335, 340, 345 by swapping locations of the portions of transposed data 335, 340 when writing the portions of transposed data 330, 335, 340, 345 to the memory circuitry 215. In the example of FIG. 3E, at the ninth time 395, the formatted array of data 350 is formatted in columns. For example, a first column contains data A0 through A15, a second column contains data A20 through A35, a third column contains data A40 through A55, etc. In some examples, such as the radar system 100, the second format may be referred to as ID data, where the axis is a doppler aspect (e.g., velocity, speed, etc.).

After the ninth time 395, the programmable circuitry 240 may perform second operations using the formatted array of data 350 in the memory circuitry 215. For example, in the radar system 100, the programmable circuitry 240 may perform a doppler FFT using the formatted array of data 350. A doppler FFT is a series of calculations that, when performed on data, convert the data to a time domain. For example, doppler FFT processing may be performed on the formatted array of data 350 to determine speeds of objects.

Advantageously, the data router circuitry 210 may linearly write the formatted array of data 350 to the memory circuitry 215 using the portions of transposed data 330, 335, 340, 345 in the memory circuitry 205. Advantageously, the processing system 200 uses movement of data through the memory circuitry 205, 215 and the buffer circuitry 245 to transpose the array of data 305 without needing additional memory. Advantageously, the processing system 200 may perform first calculations using the array of data 305 having the first format (e.g., organized in rows) and second calculations using the formatted array of data 305 having the second format (e.g., organized in columns) without increasing an amount of the memory circuitry 205, 215 occupied by the original data of the array of data 305.

Figure 4:
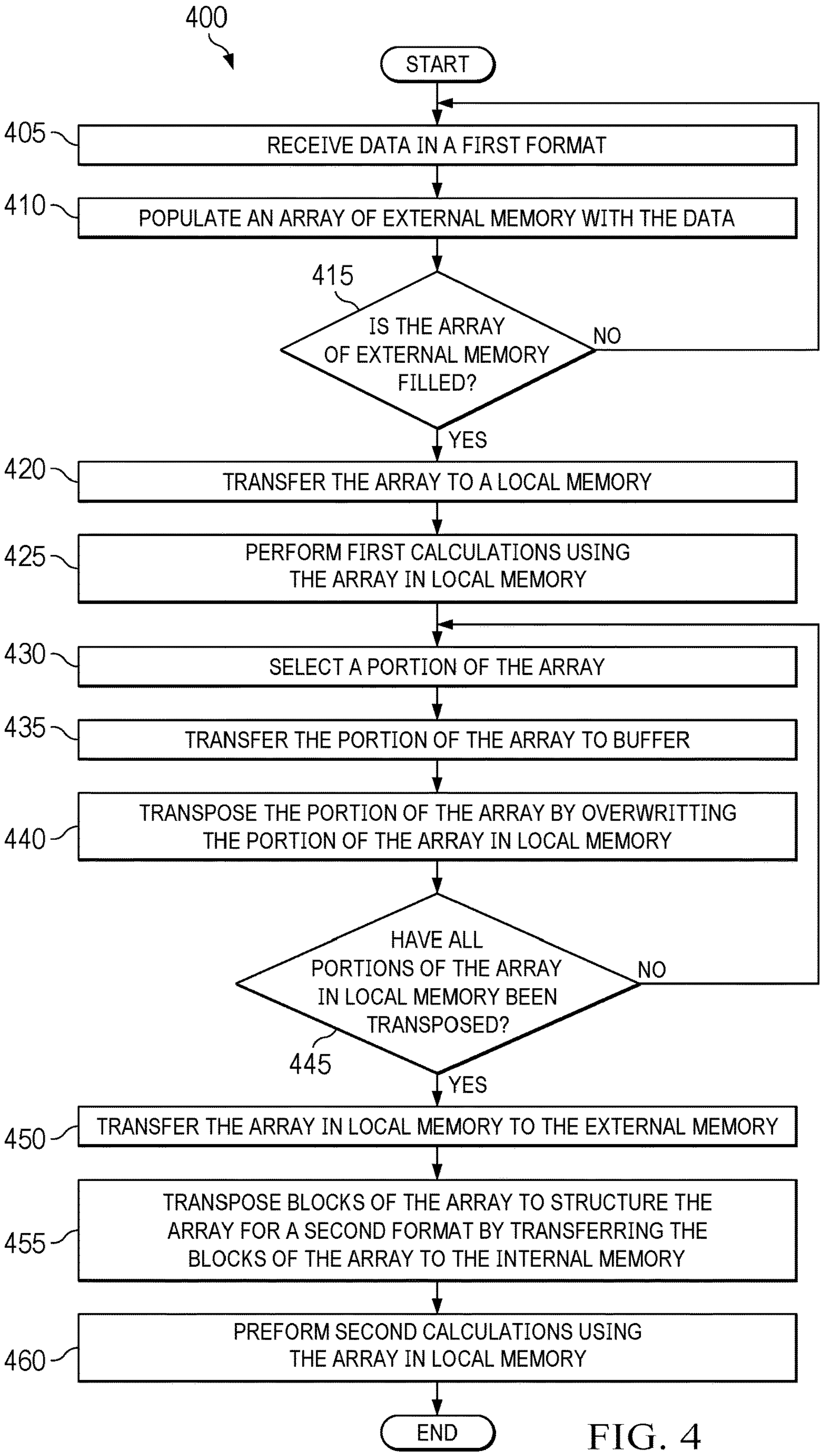
FIG. 4 is a flowchart representative of example machine-readable instructions and example operations that may be at least one of executed, instantiated, or performed using the example signal processing circuitry of FIG. 2.

FIG. 4 is a flowchart representative of example machine-readable instructions and example operations 400 that may be at least one of executed, instantiated, or performed using the example processing system 200 of FIG. 2. The example operations 400 of FIG. 4 begin at Block 405, at which the processing system 200 of FIG. 2 receives data in a first format. (Block 405). In some examples, the processing system 200 receives digital data from an external data source. For example, in the radar system 100 of FIG. 1, the AFE circuitry 120 of FIG. 1 supplies data of reflected chirps to the signal processing circuitry 110 of FIG. 1.

The processing system 200 populates an array of external memory with the data. (Block 410). In some examples, the external data source writes the digital data to the memory circuitry 205. For example, in the radar system 100, the signal processing circuitry 110 is structured to write the radar data directly to the memory circuitry 205. In such examples, the signal processing circuitry 110 may perform filtering operations to generate the radar data from data of the reflected chirps. In other examples, the processing system 200 may include memory manager circuitry coupled between the external data source and the memory circuitry 205. In such examples, the memory manager circuitry orchestrates storing digital data in the memory circuitry 205.

The processing system 200 determines if the array of external memory is full. (Block 415). In some examples, the programmable circuitry 240 of FIG. 2 waits for the memory circuitry 205 to store a predetermined amount of data before processing the data. In such examples, the processing system 200 waits for the external data source to completely fill the array of data 305 of FIGS. 3A-3E before processing data of the array of data 305. For example, in the radar system 100, the signal processing circuitry 110 waits for the receiver circuitry 150 to provide data of a series of reflected chirps before initiating processing operations. If the processing system 200 determines that the array of the external memory is not full (e.g., Block 415 returns a result of NO), control proceeds to return to Block 405.

If the processing system 200 determines that the array of the external memory is full (e.g., Block 415 returns a result of YES), the data router circuitry 210 of FIG. 2 transfers the array to local memory. (Block 420). In some examples, the data router circuitry 210 transfers the array of data 305 from the memory circuitry 205 to the memory circuitry 215. When in the memory circuitry 215, the array of data 305 is accessible to the programmable circuitry 240 of FIG. 2. In such examples, the data router circuitry 210 structures DMA circuitry to transfer the array of data 305 to the memory circuitry 215. For example, between the times 355, 360 of FIG. 3A, the data router circuitry 210 transfers the array of data 305 to the memory circuitry 215.

The programmable circuitry 240 performs first calculations using the array in local memory. (Block 425). In some examples, the programmable circuitry 240 uses data from the second memory circuitry 215 to perform calculations. For example, in the radar system 100, the programmable circuitry 240 executes machine-readable instructions to instantiate circuitry to perform a range FFT using the array of data 305 in the memory circuitry 215. In such examples, the programmable circuitry 240 determines distances of objects responsive to performing the range FFT using the array of data 305.

Although the example operations 400 of FIG. 4 illustrate the programmable circuitry 240 as performing the first calculation of Block 425 prior to performance of Blocks 430, 435, 440, 445, the processing system 200 may perform the first calculations of Block 425 during the operations of Blocks 430, 435, 440, 445. For example, the programmable circuitry 240 may use the operations of Blocks 430, 435, 440, 445 to window the array of data 305 during a performance of the first calculations. Accordingly, the operations of Blocks 430, 435, 440, 445 may occur during or in parallel with the operations of Block 425. Advantageously, performing the operations of Blocks 430, 435, 440, 445 during a performance of the operations of Block 425 further reduces a number of additional operations that the processing system 200 needs to perform to reformate the array of data 305.

The streaming address generator circuitry 230, 235 selects a portion of the array. (Block 430). In some examples, the streaming address generator circuitry 230, 235 determines memory addresses of one of the portions of data 310, 315, 320, 325 of FIG. 3. In such examples, the streaming address generator circuitry 230, 235 structures the one of the streaming engine circuitry 220, 225 structures the one of the streaming engine circuitry 220, 225 to buffer the one of the portions of the data 310, 315, 320, 325 using the selected memory addresses. For example, the streaming address generator circuitry 230 creates and offset of a current memory read to set the location of a read or write operations. In such an example, the streaming address generator circuitry 235 may write data to the offset memory location.

The streaming engine circuitry 220, 225 transfers the portion of the array to a buffer. (Block 435). In some examples, one of the streaming engine circuitry 220, 225 transfers the one of the portions of data 310, 315, 320, 325 to the corresponding one of the buffer circuitry 245, 250 of FIG. 2. For example, when the streaming address generator circuitry 230 selects the first portion of data 315, the streaming engine circuitry 220 transfers the first portion of data 315 to the buffer circuitry 245. In such examples, the streaming engine circuitry 220 buffers the first portion of data 315. Such an example operation is illustrated at the third time 365 of FIG. 3B.

The streaming engine circuitry 220, 225 transposes the portion of the array by overwriting the portion of the array in local memory. (Block 440). In some examples, the programmable circuitry 240 causes the streaming engine circuitry 220, 225 to write a transpose of the one of the portions of data 310, 315, 320, 325 to the original memory locations of the one of the portions of data 310, 315, 320, 325 in the memory circuitry 215. For example, between the times 365, 370 of FIG. 3B, the programmable circuitry 240 uses the streaming engine circuitry 220 to write the first portion of transposed data 330 of FIGS. 3A-3E to the memory addresses M310 of FIG. 3B. In such examples, the first portion of transposed data 330 replaces the first portion of data 310 in the memory circuitry 215.

The programmable circuitry 240 determines if all portions of the array in local memory have been transposed. (Block 445). In some examples, the programmable circuitry 240 continues to access the portions of data 310, 315, 320, 325 in the memory circuitry 215 until the programmable circuitry 240 finishes performing the first calculations. For example, in the radar system 100, the programmable circuitry 240 continues to window the array of data 305 for the range FFT calculations until all portions of the array of data 305 have been processed. If the programmable circuitry 240 determines that not all portions of the array in local memory have been transposed (e.g., Block 445 returns a result of NO), control proceeds to return to Block 430 at which the streaming address generator circuitry 230 selects another portion of the array.

If the programmable circuitry 240 determines that all portions of the array in local memory have been transposed (e.g., Block 445 returns a result of YES), the data router circuitry 210 transfers the array in local memory to the external memory. (Block 450). In some examples, once the programmable circuitry 240 completes the first calculations and transposing the portions of data 310, 315, 320, 325, the data router circuitry 210 transfers the portions of transposed data 330, 335, 340, 345 of FIGS. 3A-3E to the memory circuitry 205. In such examples, upon completion of the operations of Blocks 425, 430, 435, 440, 445, the processing system 200 no longer needs the portions of transposed data 330, 335, 340, 345 to remain accessible to the programmable circuitry 240. For example, after the seventh time 385 of FIG. 3D, the programmable circuitry 240 has no further operations to perform using the portions of transposed data 330, 335, 340, 345. In such examples, the data router circuitry 210 transfers the portions of transposed data 330, 335, 340, 345 to the memory circuitry 205 to increase the availability of the memory circuitry 215. Such example operations occur between the times 385, 390 of FIG. 3D.

The data router circuitry 210 transposes blocks of the array to structure the array for a second format by transferring the blocks of the array to the internal memory. (Block 455). In some examples, the data router circuitry 210 structures DMA circuitry to rearrange the portions of transposed data 330, 335, 340, 345 during a transfer to the memory circuitry 215. In such examples, the data router circuitry 210 transposes the portions of transposed data 330, 335, 340, 345 by rearranging data of the portions of transposed data 330, 335, 340, 345. For example, between the times 390, 395 of FIGS. 3D and 3E, the data router circuitry 210 rearranges the portions of transposed data 335, 340 during a transfer of the portions of transposed data 330, 335, 340, 345 to the memory circuitry 215. Advantageously, the data router circuitry 210 generates the formatted array of data 350 of FIG. 3E, which has the data of the array of data 305 formatted in columns. Advantageously, the processing system 200 reformats the array of data 305 without using additional portions of the memory circuitry 205, 215.

The programmable circuitry 240 performs second calculations using the array in local memory. (Block 460). In some examples, the programmable circuitry 240 uses the formatted data 350 in the second memory circuitry 215 to perform calculations. For example, in the radar system 100, the programmable circuitry 240 executes machine-readable instructions to instantiate circuitry to perform a doppler FFT using the formatted array of data 350 in the memory circuitry 215. In such examples, the programmable circuitry 240 determines speeds of objects responsive to performing the doppler FFT using the formatted array of data 350. Control proceeds to end.

Although example methods are described with reference to the flowchart illustrated in FIG. 4, many other methods of implementing the processing system 200 may also be used in this description. For example, the order of execution of the blocks may be changed, or some of the blocks described may be changed, eliminated, or combined. Similarly, additional operations may be included in the manufacturing process before, in between, or after the blocks shown in the illustrated examples.

Figure 5:
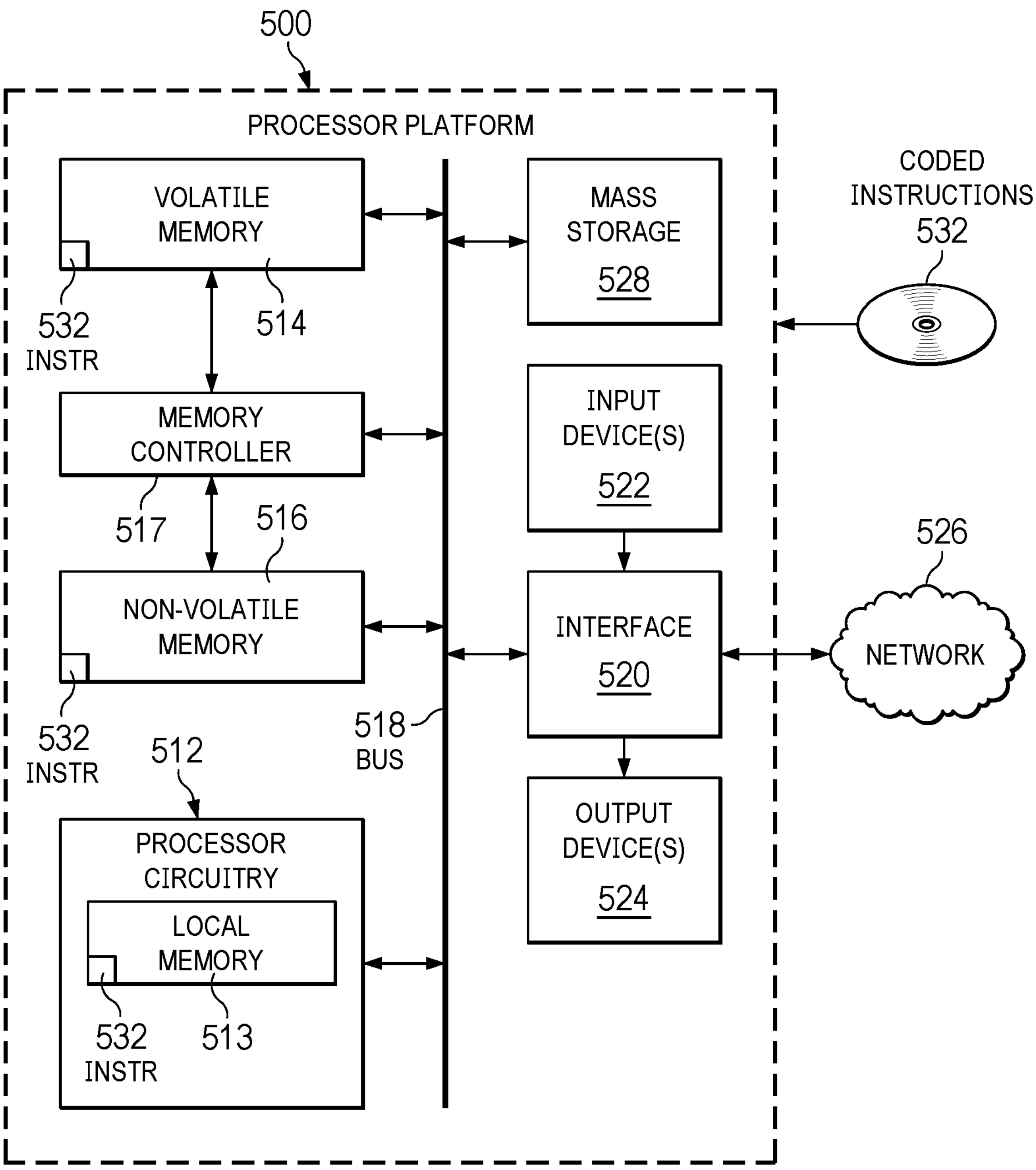
FIG. 5 is a block diagram of an example processing platform including programmable circuitry structured to execute, instantiate, or perform the example machine-readable instructions or perform the example operations of FIG. 4 to implement the processing system of FIG. 2.

FIG. 5 is a block diagram of an example programmable circuitry platform 500 structured to one or a combination of execute or instantiate one or more of the example machine-readable instructions or the example operations of FIG. 4 to implement the processing system of FIG. 2. The programmable circuitry platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing or electronic device.

The programmable circuitry platform 500 of the illustrated example includes programmable circuitry 512. The programmable circuitry 512 of the illustrated example is hardware. For example, the programmable circuitry 512 can be implemented by one or more integrated circuits, logic circuits, FPGAs, microprocessors, CPUs, GPUs, DSPs, or microcontrollers from any desired family or manufacturer. The programmable circuitry 512 may be implemented by one or more semiconductor based (e.g., silicon based) devices. In this example, the programmable circuitry 512 implements one or more components of the processing system 200 of FIG. 2.

The programmable circuitry 512 of the illustrated example includes a local memory 513 (e.g., a cache, registers, etc.). The programmable circuitry 512 of the illustrated example is in communication with main memory 514, 516, which includes a volatile memory 514 and a non-volatile memory 516, by a bus 518. The volatile memory 514 may be implemented by one or more Synchronous Dynamic Random Access Memory (SDRAM), Dynamic Random Access Memory (DRAM), RAMBUS® Dynamic Random Access Memory (RDRAM®), or any other type of RAM device. The non-volatile memory 516 may be implemented by one or a combination of flash memory or any other desired type of memory device. Access to the main memory 514, 516 of the illustrated examples is controlled by a memory controller 517. In some examples, the memory controller 517 may be implemented by one or more integrated circuits, logic circuits, microcontrollers from any desired family or manufacturer, or any other type of circuitry to manage the flow of data going to and from the main memory 514, 516.

The programmable circuitry platform 500 of the illustrated example also includes interface circuitry 520. The interface circuitry 520 may be implemented by hardware in according to any type of interface standard, such as an Ethernet interface, a universal serial bus (USB) interface, a Bluetooth® interface, a near field communication (NFC) interface, a Peripheral Component Interconnect (PCI) interface, or a Peripheral Component Interconnect Express (PCIe) interface.

In the illustrated example, one or more input devices 522 are connected to the interface circuitry 520. The input device(s) 522 permit(s) a user (e.g., a human user, a machine user, etc.) to enter one of or a combination of data or commands into the programmable circuitry 512. The input device(s) 522 can be implemented by, for example, one of or a combination of an audio sensor, a microphone, a camera (still or video), a keyboard, a button, a mouse, a touchscreen, a trackpad, a trackball, an isopoint device, or a voice recognition system.

One or more output devices 524 are also connected to the interface circuitry 520 of the illustrated example. The output device(s) 524 can be implemented, for example, by one of or a combination of display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, or speaker. The interface circuitry 520 of the illustrated example, thus, includes one of or a combination of a graphics driver card, a graphics driver chip, or graphics processor circuitry such as a GPU.

The interface circuitry 520 of the illustrated example also includes a communication device such as one of or a combination of a transmitter, a receiver, a transceiver, a modem, a residential gateway, a wireless access point, or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 500 of the illustrated example also includes one or more mass storage discs or devices 528 to store one or more of firmware, software, or data. Examples of such mass storage discs or devices 528 include one or more magnetic storage devices (e.g., floppy disk, drives, HDDs, etc.), optical storage devices (e.g., Blu-ray disks, CDs, DVDs, etc.), RAID systems, or solid-state storage discs or devices such as flash memory devices and SSDs.

The machine-readable instructions 532, which may be implemented by the machine-readable instructions of FIG. 4, may be stored in one of or a combination of the mass storage device 528, in the volatile memory 514, in the non-volatile memory 516, or on at least one non-transitory computer readable storage medium such as a CD or DVD which may be removable.

Figure 6:
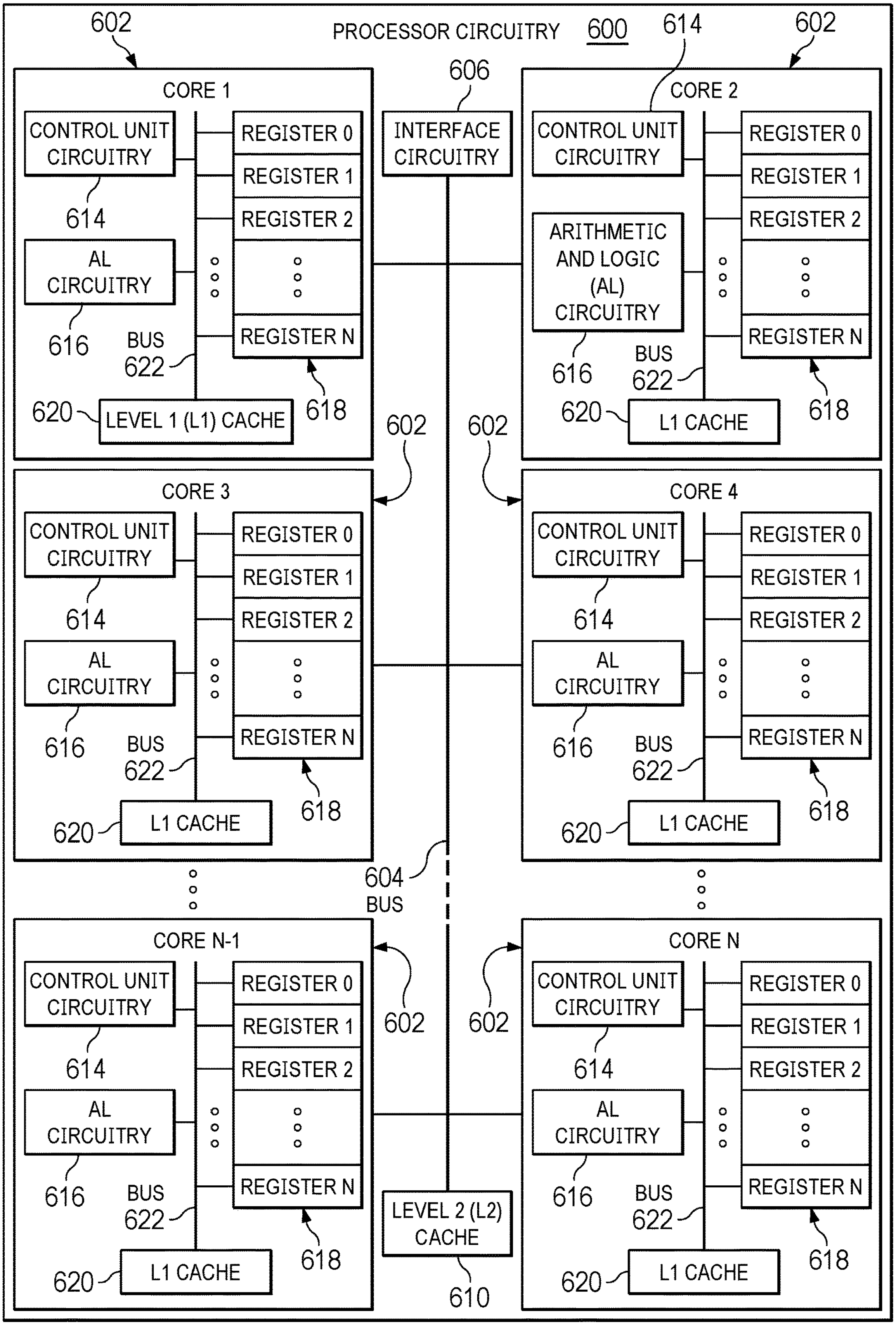
FIG. 6 is a block diagram of an example implementation of the programmable circuitry of FIG. 5.

FIG. 6 is a block diagram of an example implementation of the programmable circuitry 512 of FIG. 5. In this example, the programmable circuitry 512 of FIG. 5 is implemented by a microprocessor 600. For example, the microprocessor 600 may be a general-purpose microprocessor (e.g., general-purpose microprocessor circuitry). The microprocessor 600 executes some or all of the machine-readable instructions of the flowcharts of FIG. 4 to effectively instantiate the circuitry of FIG. 2 as logic circuits to perform operations corresponding to those machine-readable instructions. In some such examples, the circuitry of FIG. 2 is instantiated by the hardware circuits of the microprocessor 600 in combination with the machine-readable instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine-readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine-readable instructions or operations represented by the flowcharts of FIG. 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Also or alternatively, the first bus 604 may be implemented by any other type of computing or electrical bus. The cores 602 may obtain data, instructions, and signals from one or more external devices by example interface circuitry 606. The cores 602 may output data, instructions, and signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and instructions. Data and instructions may be transferred (e.g., shared) by one of or a combination of writing to or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic or logic operations on the data within the corresponding core 602. The AL circuitry 616 of some examples performs integer based operations. In other examples, the AL circuitry 616 also performs floating-point operations. In yet other examples, the AL circuitry 616 may include first AL circuitry that performs integer-based operations and second AL circuitry that performs floating-point operations. In some examples, the AL circuitry 616 may be referred to as an Arithmetic Logic Unit (ALU).

The registers 618 are semiconductor-based structures to store data and instructions such as results of one or more of the operations performed by the AL circuitry 616 of the corresponding core 602. For example, the registers 618 may include vector register(s), SIMD register(s), general-purpose register(s), flag register(s), segment register(s), machine-specific register(s), instruction pointer register(s), control register(s), debug register(s), memory management register (s), machine check register(s), etc. The registers 618 may be arranged in a bank as shown in FIG. 6. Alternatively, the registers 618 may be organized in any other arrangement, format, or structure, such as by being distributed throughout the core 602 to shorten access time. The second bus 622 may be implemented by at least one of an I2C bus, a SPI bus, a PCI bus, or a PCIe bus.

Each core 602 or, more generally, the microprocessor 600 may include additional or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) or other circuitry may be present. The microprocessor 600 is a semiconductor device fabricated to include many transistors interconnected to implement the structures described above in one or more integrated circuits (ICs) contained in one or more packages.

The microprocessor 600 may include or cooperate with one or more accelerators (e.g., acceleration circuitry, hardware accelerators, etc.). In some examples, accelerators are implemented by logic circuitry to perform certain tasks more quickly and efficiently than can be done by a general-purpose processor. Examples of accelerators include ASICs and FPGAs such as those discussed herein. A GPU, DSP, or other programmable device can also be an accelerator. Accelerators may be on-board the microprocessor 600, in the same chip package as the microprocessor 600, or in one or more separate packages from the microprocessor 600.

Figure 7:
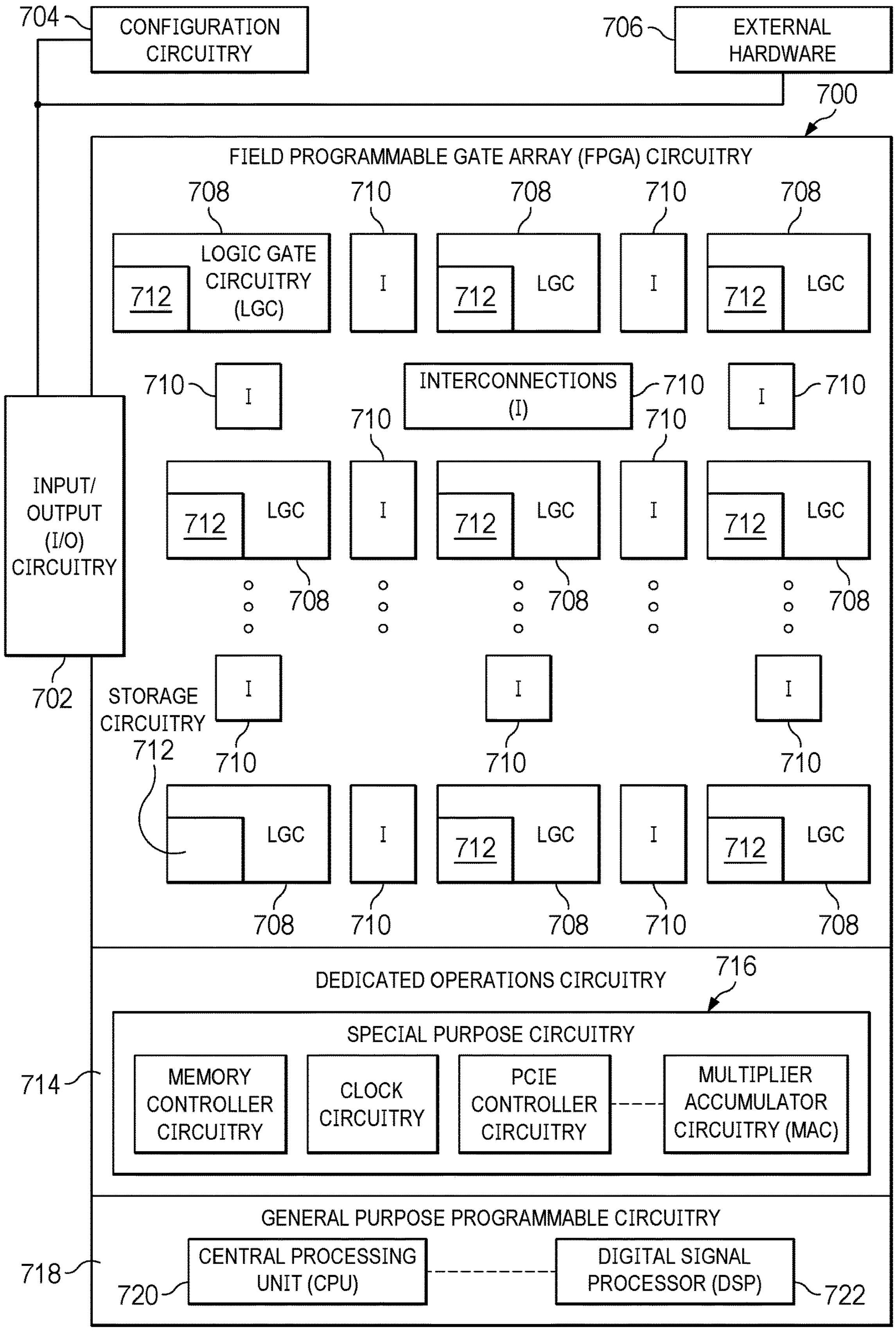
FIG. 7 is a block diagram of another example implementation of the programmable circuitry of FIG. 5.

FIG. 7 is a block diagram of another example implementation of the programmable circuitry 512 of FIG. 5. In this example, the programmable circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine-readable instructions. However, once configured, the FPGA circuitry 700 instantiates the operations and functions corresponding to the machine-readable instructions in hardware and, thus, can often execute the operations/functions faster than they could be performed by a general-purpose microprocessor executing the corresponding software.

More specifically, in contrast to the microprocessor 600 of FIG. 6 described above (which is a general purpose device that may be programmed to execute some or all of the machine-readable instructions represented by the flowchart of FIG. 4 but whose interconnections and logic circuitry are fixed once fabricated), the FPGA circuitry 700 of the example of FIG. 7 includes interconnections and logic circuitry that may be one of or a combination of configured, structured, programmed, and interconnected in different ways after fabrication to instantiate, for example, some or all of the operations/functions corresponding to the machine-readable instructions represented by the flowchart of FIG. 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 4. As such, the FPGA circuitry 700 may be at least one of configured or structured to effectively instantiate some or all of the operations/functions corresponding to the machine-readable instructions of the flowchart of FIG. 4 as dedicated logic circuits to perform the operations/functions corresponding to those software instructions in a dedicated manner analogous to an ASIC. Therefore, the FPGA circuitry 700 may perform the operations/functions corresponding to the some or all of the machine-readable instructions of FIG. 4 faster than the general-purpose microprocessor can execute the same.

In the example of FIG. 7, the FPGA circuitry 700 is at least one of configured or structured in response to being programmed (and/or reprogrammed one or more times) based on a binary file. In some examples, the binary file may be one of or both of compiled or generated based on instructions in a hardware description language (HDL) such as Lucid, Very High-Speed Integrated Circuits (VHSIC)

Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 700 of FIG. 7 may at least one of access or load the binary file to cause the FPGA circuitry 700 of FIG. 7 to be at least one of configured or structured to perform the one or more operations/functions. For example, the binary file may be implemented by one of or a combination of a bit stream (e.g., one or more computer-readable bits, one or more machine-readable bits, etc.), data (e.g., computer-readable data, machine-readable data, etc.), or machine-readable instructions accessible to the FPGA circuitry 700 of FIG. 7 to at least one of configure or structure the FPGA circuitry 700 of FIG. 7, or portion(s) thereof.

In some examples, the binary file is at least one of compiled, generated, transformed, or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is at least one of compiled, generated, or otherwise output from the uniform software platform based on the second instructions. In some examples, the FPGA circuitry 700 of FIG. 7 may at least one of access or load the binary file to cause the FPGA circuitry 700 of FIG. 7 to be at least one of configured or structured to perform the one or more operations/functions. For example, the binary file may be implemented by one of or a combination of a bit stream (e.g., one or more computer-readable bits, one or more machine-readable bits, etc.), data (e.g., computer-readable data, machine-readable data, etc.), or machine-readable instructions accessible to the FPGA circuitry 700 of FIG. 7 to at least one of configure or structure the FPGA circuitry 700 of FIG. 7, or portion(s) thereof.

The FPGA circuitry 700 of FIG. 7, includes example input/output (I/O) circuitry 702 to at least one of obtain or output data to/from at least one of example configuration circuitry 704 or external hardware 706. For example, the configuration circuitry 704 may be implemented by interface circuitry that may obtain a binary file, which may be implemented by one or more of a bit stream, data, or machine-readable instructions, to configure the FPGA circuitry 700, or portion(s) thereof. In some such examples, the configuration circuitry 704 may obtain the binary file from one of or a combination of a user, a machine (e.g., hardware circuitry (e.g., programmable or dedicated circuitry) that may implement an Artificial Intelligence/Machine Learning (AI/ML) model to generate the binary file, etc.), or any combination(s) thereof). In some examples, the external hardware 706 may be implemented by external hardware circuitry. For example, the external hardware 706 may be implemented by the microprocessor 600 of FIG. 6.

The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations/functions that may correspond to at least some of the machine-readable instructions of FIG. 4 and/or other desired operations. The logic gate circuitry 708 shown in FIG. 7 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of one of or a combination of the electrical structures or the logic gates to form circuits to perform desired operations/functions. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example dedicated operations circuitry 714. In this example, the dedicated operations circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 or an example DSP 722. Other general purpose programmable circuitry 718 may also or alternatively be present such as a GPU, an XPU, etc., that can be programmed to perform other operations.

Although FIGS. 6 and 7 illustrate two example implementations of the programmable circuitry 512 of FIG. 5, many other approaches are contemplated. For example, FPGA circuitry may include an on-board CPU, such as one or more of the example CPU 720 of FIG. 6. Therefore, the programmable circuitry 512 of FIG. 5 may also be implemented by combining at least the example microprocessor 600 of FIG. 6 and the example FPGA circuitry 700 of FIG. 7. In some such hybrid examples, one or more cores 602 of FIG. 6 may execute a first portion of the machine-readable instructions represented by the flowchart of FIG. 4 to perform first operation(s)/function(s), the FPGA circuitry 700 of FIG. 7 may be at least one of configured or structured to perform second operation(s)/function(s) corresponding to a second portion of the machine-readable instructions represented by the flowchart of FIG. 4, and/or an ASIC may be at least one of configured or structured to perform third operation(s)/function(s) corresponding to a third portion of the machine-readable instructions represented by the flowchart of FIG. 4.

Some or all of the circuitry of FIG. 2 may, thus, be instantiated at the same or different times. For example, same and/or different portion(s) of the microprocessor 600 of FIG. 6 may be programmed to execute portion(s) of machine-readable instructions at the same and/or different times. In some examples, same and/or different portion(s) of the FPGA circuitry 700 of FIG. 7 may be at least one of configured or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 600 of FIG. 6 may execute machine-readable instructions in one or more threads executing concurrently and/or in series. In some examples, the FPGA circuitry 700 of FIG. 7 may be at least one of configured or structured to carry out operations/functions concurrently and/or in series. Moreover, in some examples, some or all of the circuitry of FIG. 2 may be implemented within one or more virtual machines or containers executing on the microprocessor 600 of FIG. 6.

In some examples, the programmable circuitry 512 of FIG. 5 may be in one or more packages. For example, at least one of the microprocessor 600 of FIG. 6 or the FPGA circuitry 700 of FIG. 7 may be in one or more packages. In some examples, an XPU may be implemented by the programmable circuitry 512 of FIG. 5, which may be in one or more packages. For example, the XPU may include a CPU (e.g., the microprocessor 600 of FIG. 6, the CPU 720 of FIG. 7, etc.) in one package, a DSP (e.g., the DSP 722 of FIG. 7) in another package, a GPU in yet another package, and an FPGA (e.g., the FPGA circuitry 700 of FIG. 7) in still yet another package.

While an example manner of implementing the processing system 200 of FIG. 2 is illustrated in FIG. 2, one or more of the elements, processes, or devices illustrated in FIG. 2 may be combined, divided, re-arranged, omitted, eliminated, or implemented in any other way. Further, one or more portions of the example processing system 200 of FIG. 2, may be implemented by hardware alone or by hardware in combination with software and firmware. Thus, for example, one or more portions of the example processing system 200, could be implemented by programmable circuitry in combination with one or more machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), or field programmable logic device(s) (FPLD(s)) such as FPGAs. Further still, the example processing system 200 of FIG. 2 may include one or more elements, processes, or devices in addition to, or instead of, those illustrated in FIG. 2, or may include more than one of any or all of the illustrated elements, processes and devices.

A flowchart representative of example machine-readable instructions, which may be executed by programmable circuitry to at least one of implement or instantiate the processing system 200 of FIG. 2 or representative of example operations which cause programmable circuitry to at least one of implement or instantiate the processing system 200 of FIG. 2, are shown in FIG. 4. The machine-readable instructions may be one or more executable programs or portion(s) of one or more executable programs for execution by programmable circuitry such as the programmable circuitry 512 shown in the example processor platform 500 discussed below in connection with FIG. 5 and may be one or more function(s) or portion(s) of functions to be performed by the example programmable circuitry (e.g., an FPGA) discussed below in connection with FIG. 6 or 7. In some examples, the machine-readable instructions cause an operation, a task, etc., to be carried out or performed in an automated manner in the real-world. As used herein, "automated" means without human involvement.

The program may be embodied in instructions (e.g., software and/or firmware) stored on one or more non-transitory computer readable and/or machine-readable storage medium such as one of or a combination of cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), or any other storage device or storage disk. The instructions of the non-transitory computer readable and/or machine-readable medium may program or be executed by programmable circuitry located in one or more hardware devices, but the entire program or parts thereof could alternatively be executed or instantiated by one or more hardware devices other than the programmable circuitry or embodied in dedicated hardware. The machine-readable instructions may be distributed across multiple hardware devices or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 4, many other methods of implementing the example processing system 200 may alternatively be used. For example, the order of execution of the blocks of the flowchart(s) may be changed, or some of the blocks described may be changed, eliminated, or combined. Also or alternatively, any or all of the blocks of the flow chart may be implemented by one or more hardware circuits (e.g., processor circuitry, discrete, integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations or local to one or more hardware devices (e.g., a single-core processor (e.g., a single core CPU), a multi-core processor (e.g., a multi-core CPU, an XPU, etc.)). For example, the programmable circuitry may be one of or a combination of a CPU or an FPGA located in the same package (e.g., the same integrated circuit (IC) package or in two or more separate housings), one or more processors in a single machine, multiple processors distributed across multiple servers of a server rack, multiple processors distributed across one or more server racks, etc., or any combination(s) thereof.

The machine-readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, or produce machine executable instructions. For example, the machine-readable instructions may be fragmented and stored on one or more storage devices, disks or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, or executable by a computing device or other machine. For example, the machine-readable instructions may be stored in multiple parts, which are individually compressed, encrypted, or stored on separate computing devices, the parts when decrypted, decompressed, or combined form a set of one or more computer-executable or machine executable instructions that implement one or more functions or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions or the corresponding program(s) can be executed in whole or in part. Thus, machine-readable, computer readable or machine-readable media, as used herein, may include one or a combination of instructions and program(s) regardless of the particular format or state of the machine-readable instructions or program(s).

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 4 may be implemented using executable instructions (e.g., computer readable and/or machine-readable instructions) stored on one or more non-transitory computer readable or machine-readable media. As used herein, the terms non-transitory computer readable medium, non-transitory computer readable storage medium, non-transitory machine-readable medium, and non-transitory machine-readable storage medium are expressly defined to include any type of computer readable storage device or storage disk and to exclude propagating signals and to exclude transmission media. Examples of such non-transitory computer readable medium, non-transitory computer readable storage medium, non-transitory machine-readable medium, or non-transitory machine-readable storage medium include one or more optical storage devices, magnetic storage devices, an HDD, a flash memory, a read-only memory (ROM), a CD, a DVD, a cache, a RAM of any type, a register, or any other storage device or storage disk in which information is stored for any duration (e.g., for extended time periods, permanently, for brief instances, for temporarily buffering, for caching of the information). As used herein, the terms "non-transitory computer readable storage device" and "non-transitory machine-readable storage device" are defined to include any physical (mechanical, magnetic, electromechanical, or electrical) hardware to retain information for a time period, but to exclude propagating signals and to exclude transmission media. Examples of non-transitory computer readable storage devices or non-transitory machine-readable storage devices include one or a combination of random-access memory of any type, read only memory of any type, solid state memory, flash memory, optical discs, magnetic disks, disk drives, or redundant array of independent disks (RAID) systems. As used herein, the term "device" refers to physical structure such as one of or a combination of mechanical, electromechanical, or electrical equipment, hardware, or circuitry that may or may not be configured by computer readable instructions, machine-readable instructions, etc., or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and things, the phrase "at least one of A and B" refers to implementations including any of (1) at least one A, (2) at least one B, or (3) at least one A and at least one B. Similarly, as used herein in the context of describing structures, components, items, objects and things, the phrase "at least one of A or B" refers to implementations including any of (1) at least one A, (2) at least one B, or (3) at least one A and at least one B. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may possibly be combined, and the inclusion in different examples or claims does not imply that a combination of features is at least one of not feasible or advantageous.

As used herein, unless otherwise stated, the term “above” describes the relationship of two parts relative to Earth. A first part is above a second part, if the second part has at least one part between Earth and the first part. Likewise, as used herein, a first part is “below” a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by at least one of the connection reference or relative movement between those elements unless otherwise indicated. As such, connection references do not necessarily infer that two elements are directly connected or in fixed relation to each other. As used herein, stating that any part is in “contact” with another part is defined to mean that there is no intermediate part between the two parts.

Unless specifically stated otherwise, descriptors such as “first,” “second,” “third,” etc., are used herein without imputing or otherwise indicating any meaning of priority, physical order, arrangement in a list, or ordering in any way, but are merely used as at least one of labels or arbitrary names to distinguish elements for case of understanding the described examples. In some examples, the descriptor “first” may be used to refer to an element in the detailed description, while the same element may be referred to in a claim with a different descriptor such as “second” or “third.” In such instances, such descriptors are used merely for identifying those elements distinctly within the context of the discussion (e.g., within a claim) in which the elements might, for example, otherwise share a same name.

As used herein, “approximately” and “about” modify their subjects/values to recognize the potential presence of variations that occur in real world applications. For example, “approximately” and “about” may modify dimensions that may not be exact due to at least one of manufacturing tolerances or other real-world imperfections. For example, “approximately” and “about” may indicate such dimensions may be within a tolerance range of +/−10% unless otherwise specified herein.

As used herein “substantially real time” refers to occurrence in a near instantaneous manner recognizing there may be real world delays for computing time, transmission, etc. Thus, unless otherwise specified, “substantially real time” refers to real time+1 second.

As used herein, the phrase “in communication,” including variations thereof, encompasses one of or a combination of direct communication or indirect communication through one or more intermediary components, and does not require direct physical (e.g., wired) communication or constant communication, but rather also includes selective communication at least one of periodic intervals, scheduled intervals, aperiodic intervals, or one-time events.

As used herein, “programmable circuitry” is defined to include at least one of (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform one or more specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to at least one of configure or structure the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term “couple” may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is “configured to” perform a task or function may be configured (e.g., at least one of programmed or hardwired) at a time of manufacturing by a manufacturer to at least one of perform the function or be configurable (or re-configurable) by a user after manufacturing to perform the function/or other additional or alternative functions. The configuring may be through at least one of firmware or software programming of the device, through at least one of a construction or layout of hardware components and interconnections of the device, or a combination thereof.

As used herein, the terms “terminal,” “node,” “interconnection,” “pin” and “lead” are used interchangeably. Unless specifically stated to the contrary, these terms are generally used to mean an interconnection between or a terminus of a device element, a circuit element, an integrated circuit, a device or other electronics or semiconductor component.

In the description and claims, described "circuitry" may include one or more circuits. A circuit or device that is described herein as including certain components may instead be adapted to be coupled to those components to form the described circuitry or device. For example, a structure described as including one or more semiconductor elements (such as transistors), one or more passive elements (such as one of or a combination of resistors, capacitors, or inductors), or one or more sources (such as voltage and/or current sources) may instead include only the semiconductor elements within a single physical device (e.g., at least one of a semiconductor die or integrated circuit (IC) package) and may be adapted to be coupled to at least some of the passive elements or the sources to form the described structure either at a time of manufacture or after a time of manufacture, for example, by at least one of an end-user or a third-party.

Circuits described herein are reconfigurable to include the replaced components to provide functionality at least partially similar to functionality available prior to the component replacement. Components shown as resistors, unless otherwise stated, are generally representative of any one or more elements coupled in at least one of series or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and some features illustrated as being internal to the integrated circuit may be incorporated outside of the integrated. As used herein, the term "integrated circuit" means one or more circuits that are at least one of: (i) incorporated in/over a semiconductor substrate; (ii) incorporated in a single semiconductor package; (iii) incorporated into the same module; or (iv) incorporated in/on the same printed circuit board.

Uses of the phrase "ground" in the foregoing description include at least one of a chassis ground, an Earth ground, a floating ground, a virtual ground, a digital ground, a common ground, or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero.

Modifications are possible in the described embodiments, and other embodiments are possible, within the scope of the claims.

What is claimed is:

1. An apparatus comprising:
- memory circuitry structured to store an array of data;
- streaming engine circuitry coupled to the memory circuitry; and
- programmable circuitry coupled to the memory circuitry and the streaming engine circuitry, the programmable circuitry configured to at least one of execute or instantiate machine-readable instructions to at least:
  - cause the streaming engine circuitry to copy the array of data from first, second, third, and fourth memory addresses of the memory circuitry to a buffer;
  - perform first operations using data in the buffer, the first operations to produce a first value at a first buffer address, a second value at a second buffer address, a third value at a third buffer address, and a fourth value at fourth buffer address; and
  - write the first value to the first memory address, the third value to the second memory address, the second value to the third memory address, and the fourth value to the fourth memory address in the memory circuitry.

2. The apparatus of claim 1, wherein the memory circuitry is first memory circuitry, the streaming engine circuitry includes second memory circuitry, and the streaming engine circuitry is structured to buffer the array of data at the first, second, third, and fourth buffer addresses.

3. The apparatus of claim 1, wherein the array of data is a first portion of the array of data, the first, second, third, and fourth memory addresses of the first portion of the array of data correspond to a first memory location, the array of data further having a second portion at a second memory location in the memory circuitry, and the programmable circuitry is further configured to:
- copy the second portion of the array of data from the second memory location in the memory circuitry to the first, second, third, and fourth buffer addresses of the buffer for processing the second portion of the array of data and writing the first, second, third, and fourth values to the first memory location; and
- write a transpose of the second portion of the array of data to the second memory location in the memory circuitry.

4. The apparatus of claim 1, wherein the memory circuitry is first memory circuitry, the first, second, third, and fourth memory addresses of the array of data correspond to a first memory location, the apparatus further comprising:
- second memory circuitry structured to store the array of data at a second memory location; and
- data router circuitry coupled to the first memory circuitry and the second memory circuitry, the data router circuitry configured to:
  - transfer the array of data from the second memory circuitry to the first memory circuitry; and
  - write the array of data in the first memory circuitry to the second memory location in the second memory circuitry after the programmable circuitry transposes a plurality of portions of the array of data.

5. The apparatus of claim 4, wherein the first operations of the array of data by the programmable circuitry is a first processing of the array of data from the second memory circuitry, the data router circuitry is further configured to transfer the array of data to the first memory location in the first memory circuitry for the programmable circuitry to perform second processing of the array of data.

6. The apparatus of claim 4, wherein the array of data in the second memory circuitry has a first portion at first memory addresses in the second memory circuitry, a second portion at second memory addresses in the second memory circuitry, and a third portion at third memory addresses in the second memory circuitry, a first portion of the array of data at first memory addresses in the first memory circuitry, the array of data in the first memory circuitry further has a second portion at second memory addresses in the first memory circuitry, and a third portion at third memory addresses in the first memory circuitry, the data router circuitry further configured to:

write the first portion of the array of data at the first memory addresses in the second memory circuitry to the first memory addresses in the first memory circuitry;

write the second portion of the array of data at the second memory addresses in the second memory circuitry to the third memory addresses in the first memory circuitry; and write the third portion of the array of data at the second memory addresses in the second memory circuitry to the second memory addresses in the first memory circuitry.

7. The apparatus of claim 1, wherein the array of data is radar data, the memory circuitry is first memory circuitry, and the apparatus further comprising:

second memory circuitry coupled to the first memory circuitry; and analog front-end circuitry coupled to the second memory circuitry, the analog front-end circuitry configured to generate the radar data.

8. The apparatus of claim 1, wherein the programmable circuitry is further configured to:

cause the streaming engine circuitry to copy the first, second, third, and fourth values from the first, second, third, and fourth memory addresses in the memory circuitry to the first, second, third, and fourth buffer addresses in the buffer; and perform second operations using data in the buffer.

9. The apparatus of claim 8, wherein the array of data is radar data, the first operations are a range fast Fourier transform (FFT), and the second operations are a doppler FFT.

10. An apparatus comprising:

memory circuitry structured to store an array of data;

streaming engine circuitry coupled to the memory circuitry, the streaming engine circuitry structured to buffer data from the memory circuitry at first, second, third, and fourth buffer addresses; and programmable circuitry coupled to the memory circuitry and the streaming engine circuitry, the programmable circuitry configured to at least one of execute or instantiate machine-readable instructions to at least:

cause the streaming engine circuitry to buffer the array of data from first, second, third, and fourth memory addresses in the memory circuitry;

perform first operations using data in the buffer, the first operations to produce a first value at the first buffer address, a second value at the second buffer address, a third value at the third buffer address, and a fourth value at the fourth buffer address; and write the first value to the first memory address, the third value to the second memory address, the second value to the third memory address, and the fourth value to the fourth memory address in the memory circuitry.

11. The apparatus of claim 10, wherein the memory circuitry is first memory circuitry, the first, second, third, and fourth memory addresses of the array of data correspond to a first memory location, and the apparatus further comprising:

second memory circuitry including the array of data at a second memory location; and a data router circuitry coupled to the first memory circuitry and the second memory circuitry, the data router circuitry configured to transfer the array of data to the second memory circuitry.

12. The apparatus of claim 11, wherein the array of data has a plurality of portions, and the data router circuitry is further configured to write the array of data in the first memory circuitry to the second memory location in the second memory circuitry responsive to the programmable circuitry transposing the plurality of portions of the array of data.

13. The apparatus of claim 11, wherein the data router circuitry is further configured to transfer the array of data to the first memory location in the first memory circuitry for the programmable circuitry to perform second operations using a transposed array of data.

14. The apparatus of claim 11, wherein the array of data in the second memory circuitry has a first portion at first memory addresses in the second memory circuitry, a second portion at second memory addresses in the second memory circuitry, and a third portion at third memory addresses in the second memory circuitry, a first portion of the array of data at first memory addresses in the first memory circuitry, the array of data in the second memory circuitry further has a second portion at second memory addresses in the first memory circuitry, and a third portion at third memory addresses in the first memory circuitry, the data router circuitry further configured to:

write the first portion of the array of data at the first memory addresses in the second memory circuitry to the first memory addresses in the first memory circuitry;

write the second portion of the array of data at the second memory addresses in the second memory circuitry to the third memory addresses in the first memory circuitry; and write the third portion of the array of data at the second memory addresses in the second memory circuitry to the second memory addresses in the first memory circuitry.

15. The apparatus of claim 10, wherein a first portion of the array of data is at first memory addresses including the first, second, third, and fourth memory addresses, the array of data further having a second portion at second memory addresses, and the programmable circuitry is further configured to:

cause the streaming engine circuitry to buffer the second portion of the array of data from the second memory addresses in the memory circuitry responsive to writing the first, second, third, and fourth values to the first memory addresses; and write a transpose of the second portion of the array of data in the streaming engine circuitry to the second memory addresses in the memory circuitry.

16. The apparatus of claim 10, wherein the array of data is radar data, and the apparatus is a radar system.

17. At least one non-transitory computer readable storage medium comprising instructions that, when executed, cause programmable circuitry to at least:

cause streaming engine circuitry to buffer, at first, second, third, and fourth buffer addresses, data of an array of data in a buffer, the data of the array of data from first, second, third, and fourth memory addresses in memory circuitry;

perform first calculations using the data in the buffer, the first calculations to produce a first value at the first buffer address, a second value at the second buffer address, a third value at the third buffer address, and a fourth value at the fourth buffer address; and write the first value to the first memory address, the third value to the second memory address, the second value to the third memory address, and the fourth value to the fourth memory address in the memory circuitry.

18. The at least one non-transitory computer readable storage medium of claim 17, wherein the memory circuitry is first memory circuitry, and the instructions are to cause the programmable circuitry to:

cause a data router to write the array of data to the first, second, third, and fourth memory addresses in the first memory circuitry from first, second, third, and fourth memory addresses in second memory circuitry; and cause the data router to write a transposed array of data to the first, second, third, and fourth memory addresses in the second memory circuitry from the first, second, third, and fourth memory addresses in the first memory circuitry.

19. The at least one non-transitory computer readable storage medium of claim 17, wherein the first calculations using the array of data are in a first format, and the instructions are to cause the programmable circuitry to cause a data router circuitry to transfer the array of data to the first, second, third, and fourth memory addresses in the memory circuitry for the programmable circuitry to perform second calculations using the array of data in a second format.

20. The at least one non-transitory computer readable storage medium of claim 17, wherein the memory circuitry is first memory circuitry, the array of data is in second memory circuitry and has a first portion at first memory addresses in the second memory circuitry, a second portion at second memory addresses in the second memory circuitry, and a third portion at third memory addresses in the second memory circuitry, a first portion of the array of data at first memory addresses in the first memory circuitry, the array of data in the first memory circuitry further has a second portion at second memory addresses in the first memory circuitry, and a third portion at third memory addresses in the first memory circuitry, and the instructions are to cause the programmable circuitry to cause a data router circuitry to:

write the first portion of the array of data at the first memory addresses in the second memory circuitry to the first memory addresses in the first memory circuitry;

write the second portion of the array of data at the second memory addresses in the second memory circuitry to the third memory addresses in the first memory circuitry; and write the third portion of the array of data at the second memory addresses in the second memory circuitry to the second memory addresses in the first memory circuitry.

21. The at least one non-transitory computer readable storage medium of claim 17, wherein the array of data is a first portion of the array of data, the first, second, third, and fourth memory addresses of the first portion of the array of data are a first memory location, the array of data further having a second portion at a second memory location, and the instructions are to cause the programmable circuitry to cause the streaming engine circuitry to:

buffer the second portion of the array of data from the second memory location in the memory circuitry responsive to writing the first, second, third, and fourth values to the first memory location; and write a transpose of the second portion of the array of data in the streaming engine circuitry to the second memory location in the memory circuitry.

22. The at least one non-transitory computer readable storage medium of claim 17, wherein the first calculations are to perform a range fast Fourier transform (FFT), and the instructions are to cause the programmable circuitry to perform second calculations using a transpose of the array of data in memory circuitry, the second calculations to perform a doppler FFT.

* * * * *